United States Patent
Bancroft et al.

(10) Patent No.: US 6,584,375 B2
(45) Date of Patent: Jun. 24, 2003

(54) SYSTEM FOR A RETAIL ENVIRONMENT

(75) Inventors: Allen Bancroft, Richmond, VA (US); Charles W. Ward, Richmond, VA (US)

(73) Assignee: Intellibot, LLC, Richmond, VA (US)

( * ) Notice: Subject to any disclaimer, the term of this patent is extended or adjusted under 35 U.S.C. 154(b) by 17 days.

(21) Appl. No.: 09/906,216

(22) Filed: Jul. 16, 2001

(65) Prior Publication Data

US 2002/0165638 A1 Nov. 7, 2002

Related U.S. Application Data

(60) Provisional application No. 60/288,711, filed on May 4, 2001.

(51) Int. Cl.[7] .................................................. G06F 7/00
(52) U.S. Cl. ........................ 700/213; 700/245; 235/383
(58) Field of Search ................................ 700/213, 214, 700/216, 245, 258, 259; 186/52; 235/383

(56) References Cited

U.S. PATENT DOCUMENTS

| | | | | |
|---|---|---|---|---|
| 3,741,345 A | * | 6/1973 | Saridis ........................ 186/55 |
| 5,028,766 A | * | 7/1991 | Shah .......................... 235/375 |
| 5,073,749 A | | 12/1991 | Kanayama |
| 5,175,690 A | * | 12/1992 | Berthier et al. ............. 235/383 |
| 5,186,281 A | * | 2/1993 | Jenkins ........................ 186/55 |
| 5,206,814 A | * | 4/1993 | Cahlander et al. ............ 221/88 |
| 5,287,266 A | | 2/1994 | Malec et al. |
| 5,295,064 A | | 3/1994 | Malec et al. |
| 5,323,327 A | * | 6/1994 | Carmichael et al. ........ 235/383 |
| 5,370,492 A | * | 12/1994 | Gleyze et al. .............. 414/279 |
| 5,409,342 A | * | 4/1995 | Galli ........................... 414/21 |
| 5,416,906 A | | 5/1995 | Mariani |
| 5,440,916 A | | 8/1995 | Stone et al. |
| 5,595,263 A | * | 1/1997 | Pignataro .................... 186/53 |
| 5,720,363 A | * | 2/1998 | Kipp .......................... 186/55 |
| 5,880,449 A | | 3/1999 | Teicher et al. |
| 5,890,136 A | * | 3/1999 | Kipp .......................... 186/55 |
| 5,933,813 A | | 8/1999 | Teicher et al. |
| 5,936,240 A | | 8/1999 | Dudar et al. |
| 5,983,200 A | | 11/1999 | Slotznick |
| 5,995,942 A | | 11/1999 | Smith et al. |
| 6,158,174 A | | 12/2000 | Mairs |
| 6,236,330 B1 | | 5/2001 | Cohen |
| 6,237,145 B1 | | 5/2001 | Narasimhan et al. |
| 6,416,270 B1 | * | 7/2002 | Steury et al. ............... 414/268 |
| 6,421,580 B1 | * | 7/2002 | Robrechts .................. 414/273 |

* cited by examiner

Primary Examiner—Khoi H. Tran
(74) Attorney, Agent, or Firm—Hunton & Williams

(57) ABSTRACT

The system and method of the present invention provides a system, and in particular a robot system, and a variety of processes that may be performed by the robot system in a retail environment. The robot system, in accordance with one embodiment, includes a processor portion, a memory portion, an interaction portion and a transport portion. The processor portion of the robot system processes a wide variety of data in operation of the robot system based on a variety of inputs from the retail environment and information in the memory stores. The memory portion stores a variety of data including retail data relating to retail activity and information relating to customer interaction with the robot system. The processor portion both stores data in the memory portion and retrieves data from the memory portion in operation. The interaction portion interfaces with a customer in various ways.

42 Claims, 27 Drawing Sheets

Actions

| Action command | Primary Modifier | Secondary Modifier | Tertiary Modifier |
|---|---|---|---|
| EYEBROWS | IN, OUT, LEVEL | FAST, SLOW | LEFT, RIGHT, BOTH |
| EYELIDS | CLOSED, SLEEPY, NORMAL, WIDE, BLINK | FAST, SLOW | LEFT, RIGHT, BOTH |
| EARS | FORWARD, CENTER, BACKWARD, WIGGLE | FAST, SLOW | LEFT, RIGHT, BOTH |
| EYEBALLS | UP, DOWN, LEVEL, LEFT, RIGHT, CENTER | FAST, SLOW | |
| NECKPAN | Pan angle | | |
| NECKTILT | Tilt angle | | |
| HEADTILT | Tilt angle | | |
| MOUTH | WET, SMILE, SILENCE, OXFILL, OX, OATFILL, OAT, NEUTRAL, IFFILL, IF, FROWN, FAVE, CHURCHFILL, CHURCH, CAGEFILL, CAGE, BUMP, BEETFILL, BEET | | |
| TRACK | ON, OFF | | |
| SPEECH | Filename (.wav) | | |
| CAMERA | ON, OFF | | |
| MOVIE | Filename (.avi) | | |

Fig. 10

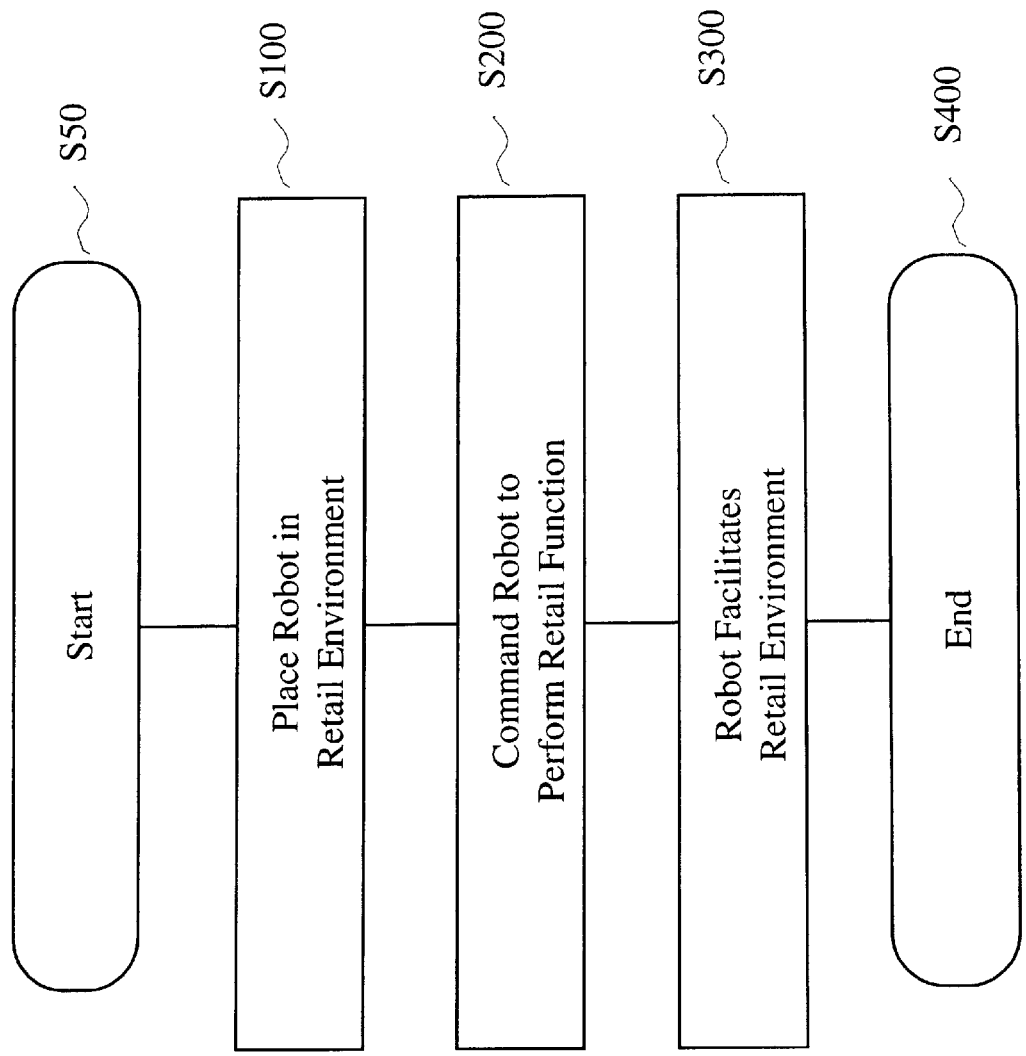

SYSTEM FOR A RETAIL ENVIRONMENT

This application claims the priority of U.S. Provisional Application No. 60/288,711 filed on May 4, 2001, which is incorporated herein by reference in its entirety. This application is related to U.S. patent application Ser. No. 09/906,159, which is filed contemporaneously herewith and which is also incorporated herein by reference in its entirety.

FIELD OF THE INVENTION

The systems and methods of the invention relate to operation of a system, and in particular a robot system, in a retail environment.

BACKGROUND OF THE INVENTION

In a retail environment such as a store, mall, shop, firm or other place of business, for example, there is a wide variety of customers and other persons. These persons often require personal attention in order to achieve what they hope to accomplish in the retail environment. Such desired accomplishments might include purchasing an item or simply investigating a product they are potentially interested in purchasing, for example. Further, the persons who work in the retail environment are often busy with a wide variety of tasks such as maintenance of the retail environment, stocking shelves or checking out customers. Additional persons to assist may not be brought in due to cost considerations. As a result, customers or other persons in the store do not receive the attention they need and desire.

As a result, a customer may walk into a store looking for a particular product. The customer may have problems finding the particular product. In a conventional retail setting, if the customer cannot find a worker, then the customer may be left with the feeling of having no recourse. As a result, the customer may well exit that particular retail environment looking for a store that might better fulfill their needs. Accordingly, a need exists to address these problems, as well as others, that exist in retail environments.

BRIEF SUMMARY OF THE INVENTION

The system and method of the present invention provides a robot system and a variety of processes that may be performed by the robot system in a retail environment. The robot system, in accordance with one embodiment, includes a processor portion, a memory portion, an interaction portion and a transport portion. The processor portion of the robot system processes a wide variety of data in operation of the robot system based on a variety of inputs from the retail environment and information in the memory stores. The memory portion stores a variety of data including retail data relating to retail activity, as well as information relating to customer interaction with the robot system. The processor portion both stores data in the memory portion and retrieves data from the memory portion in operation.

In accordance with one embodiment of the method and system of the invention, the interaction portion interfaces with a customer in various ways. The interaction portion receives input from a customer and generates output to that customer, which is responsive to the observed input. The output may be based on retail data relating to retail activity. Operation of the interaction portion is controlled by the processor portion. The robot system further may optionally include a transport portion, which provides capabilities to transport the robot system to various locations in the retail environment. A variety of processes may be performed by the robot system related to the particular retail environment and the interaction of the robot system with customers.

BRIEF DESCRIPTION OF THE DRAWINGS

The present invention can be more fully understood by reading the following detailed description of the presently preferred embodiments together with the accompanying drawings, in which like reference indicators are used to designate like elements, and in which:

FIG. 10 is a table showing a variety of actions, and modifiers used in conjunction with the actions, in accordance with one embodiment of the system and method of the invention;

FIG. 11 is a flowchart showing a method of utilizing a retail robot to facilitate a retail environment in accordance with an embodiment of the method and system of the invention;

DETAILED DESCRIPTION OF THE INVENTION

Further details of the systems and methods of the invention will hereinafter be described. As used herein, items referred to in the singular may also be in the plural, and items referred to in the plural may also be in the singular.

As used herein, a "robot" or a "robot system" is a stand-alone system, for example, that is mobile, that performs both physical activities and computational activities. The physical activities may be performed using a wide variety of movable parts including arms, hands, legs, claws, or head, for example. The computational activities may be performed utilizing a suitable processor and memory stores, i.e., a data memory storage device, for example. The computational activities may include processing information input from various sensors or other inputs of the robot to generate appropriate responses; processing the input information as, well as other data in the memory stores of the robot, to generate a variety of desired information; or outputting information that has been acquired by the robot to a desired destination, for example.

As used herein, the term "retail" or "retail sales" or "retail environment" is defined as activity relating to, but not limited to, the sale of goods or commodities or any other items, or providing any type of services, for example, to a person, such as in store, in a circus, a factory, warehouse, shop, mall, fair, outside market, display area, hospital, law firm, accounting firm, restaurant, commercial office space, convention center, hotel, airport, arena, stadium, outdoor venue or any other area either inside a structure or outside in which goods, commodities or services are provided, manufactured, stored, sold, offered for sale, displayed in anticipation of future sales, or displayed, such as for any type of promotional activities, for example.

As used herein, a "customer" is a person, or a device acting on behalf of a person, who buys, leases, or otherwise acquires or deals with goods, commodities, or services in a retail environment, or who is interested in discussing or viewing goods, commodities, or services in retail environment, for example.

Figure 1:
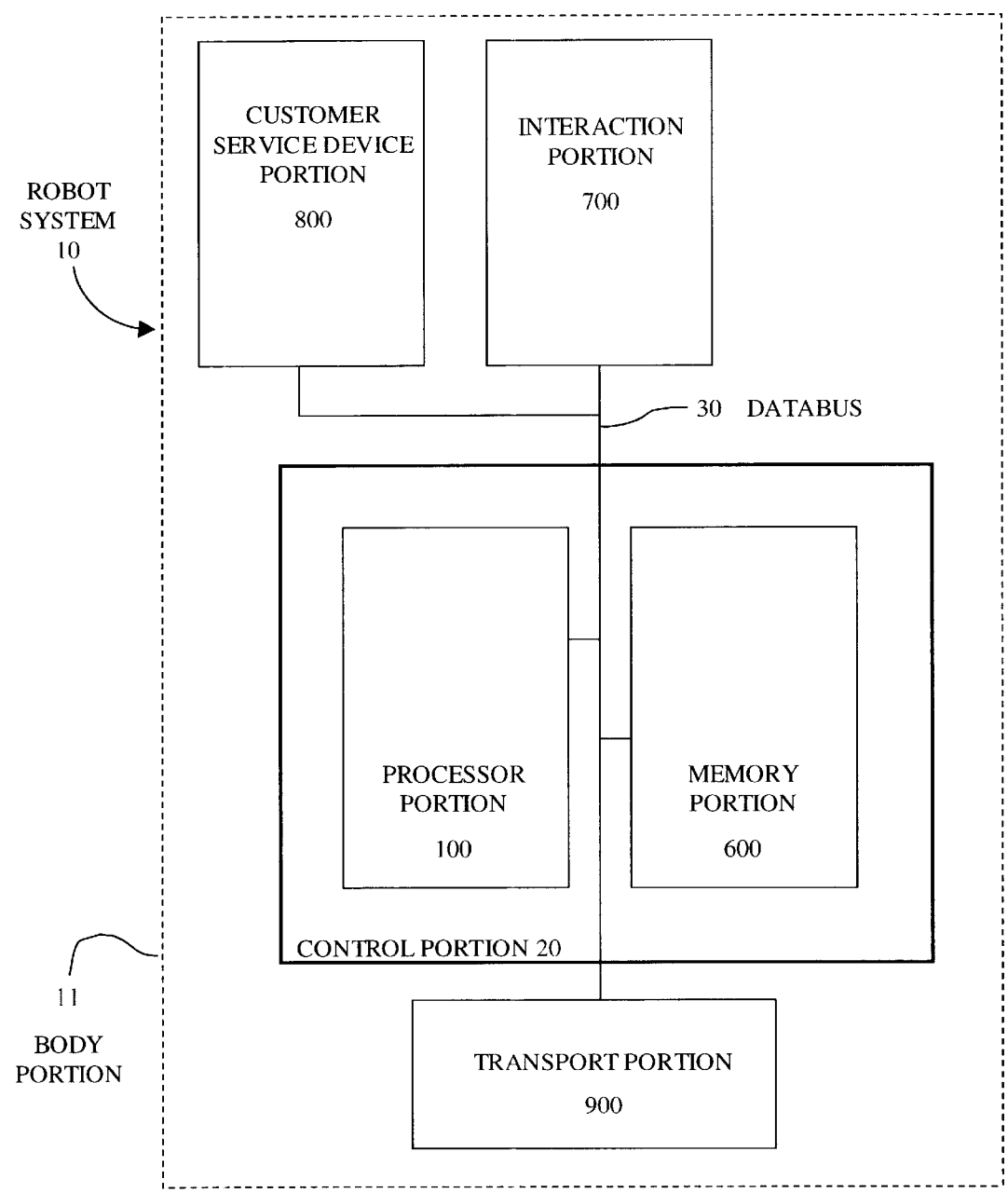
FIG. 1 is a block diagram showing a robot system in accordance with one embodiment of the system and method of the invention.

FIG. 1 is a block diagram showing a robot system 10 in accordance with one embodiment of the system and method of the invention. As shown in FIG. 1, the robot system 10 includes a control portion 20. The control portion 20 includes a processor portion 100 and a memory portion 600. The robot system 10 further includes an interaction portion 700, a customer service device portion 800, and a transport portion 900. Each of the processor portion 100, the memory portion 600, the interaction portion 700, the customer service device portion 800 and the transport portion 900 are connected to and in communication with each other through a data bus 30. However, it should of course be appreciated that any suitable communication interface might be utilized to connect the operating components of the robot system 10.

The components of the robot system 10 as described above perform a wide variety of operations. The processor portion 100 monitors and controls the various operations of the robot system 10 as described in detail below. The memory portion 600 serves as a memory store for a wide variety of data used by the processor portion 100 as well as the other components of the robot system 10. As described below, the interaction portion 700 includes a variety of operational components that are controlled by the processor portion 100. Illustratively, the interaction portion 700 includes components that allow navigation of the robot system 10 and interaction with human persons.

The robot system 10 further includes a customer service device portion 800. The customer service device portion 800 also includes a variety of components which are in communication with the processor portion 100 in accordance with some embodiments of the invention. The components contained in a customer service device portion 800 provide a variety of services to customers in a retail environment.

The robot system 10 further includes a transport portion 900. The transport portion 900 is controlled by the processor portion 100 based on data input to the processor portion 100. The transport portion 900 provides mobile capabilities to the robot system 10. The transport portion 900 may include a mechanical system of wheels or an electromechanical system, for example. Further details of the transport portion 900 are described below.

The block diagram of FIG. 1 illustrates various operating components of the robot system 10. It should be appreciated that the operating components of the robot system 10, or select operating components of the robot system 10, may be encased or enclosed in a suitable body or body portion 11, as illustrated in FIG. 1. Alternatively, it should be appreciated that the operating components of the robot system 10 may simply be suitably disposed on a support framework or structure.

Figure 22:
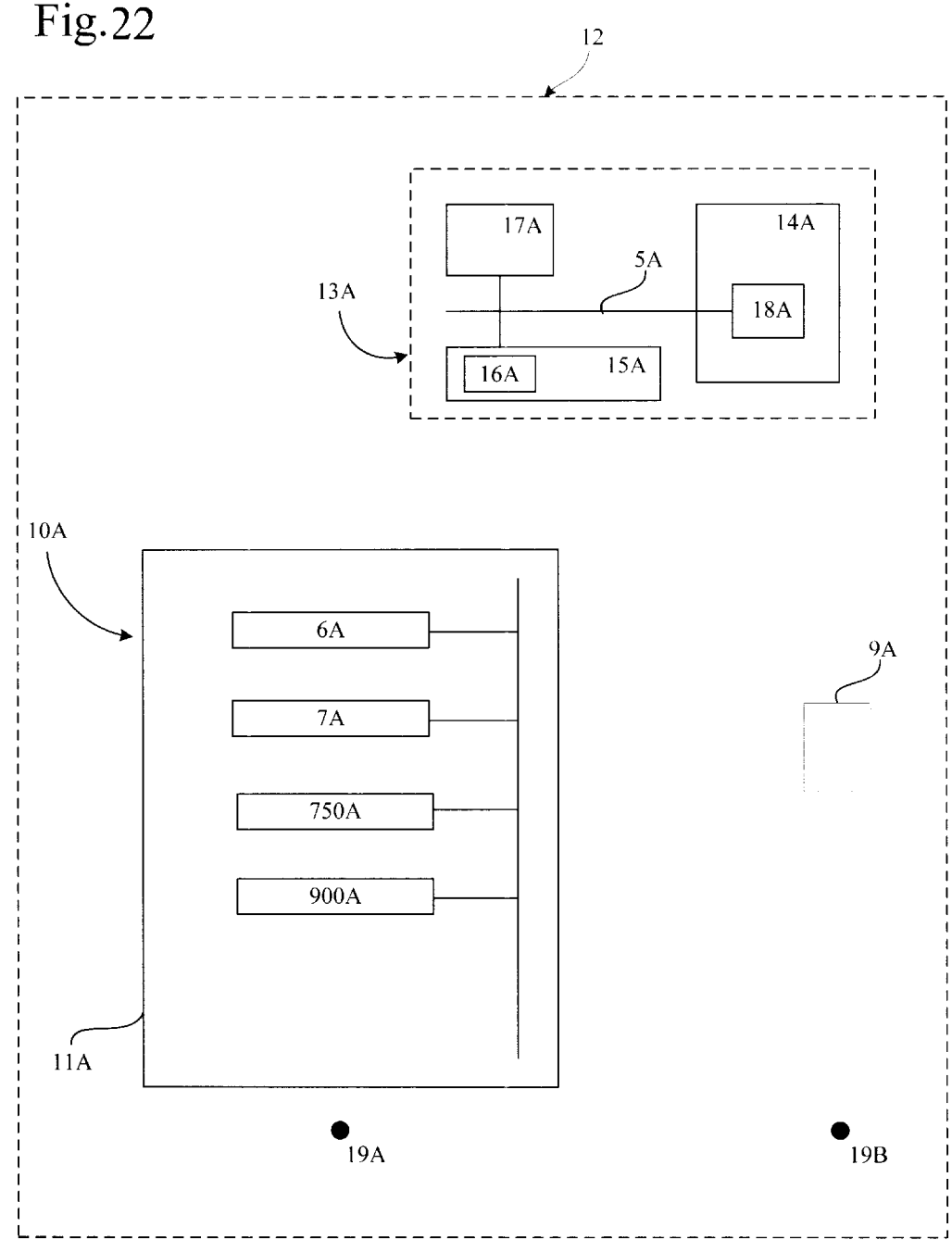
FIG. 22 is a schematic of a robot for use in a retail environment in accordance with one embodiment of the invention.

FIG. 22 is a schematic of a robot for use in a retail environment in accordance with one embodiment of the invention. As shown in FIG. 22, robot 10A is in retail environment 12A. Transport portion 900A is capable of transporting robot 10A from a first location 19A to a second location 19B. Transmission portion 750A may output visual image information and audio information to a destination 9A outside the robot 10A.

Also shown in FIG. 22, base station 13A is capable of interfacing with robot 10A to exchange data. Base station 13

A includes a base computer system 14A and a robot interface portion 17A capable of inputting data from robot 10A and outputting data to the robot 10A. Robot 10A includes a base interface portion 6A capable of inputting data from and outputting data to base station 13A. Base station 13A further includes a docking station 15A having a charger 16A. Base computer system 14A and docking station 15A may be disposed in different physical locations and be in communication with each other through network system 5A. Base computer system 14A also includes a base computing system transponder 18A which may communicate with robot transponder 7A included in robot 10A.

In accordance with the system and method of the invention, various embodiments are described herein in the context of a robot system. As described herein, the robot system performs a variety of services for customers and performs a variety of tasks in a retail environment, for example. However, it should be appreciated that some of the various services, tasks, and other operations that are described in the context of a robot system, are not limited to implementation using the described robot system.

To explain further using an illustrative example, as described below, the robot system provides the service of receiving an e-mail from a customer that contains a shopping list. Upon receiving the e-mail from the customer, the customer may then come to the store in which the robot is operating and request the shopping list from the robot. Upon identifying the customer, the robot prints or otherwise provides the shopping list to the customer.

In accordance with a further embodiment of the system and method of the invention, a particular robot may receive a shopping list through a suitable communication. Subsequent to receiving the shopping list, the robot drops off a printed shopping list at a suitable courtesy counter, as well as indicates the time for which the items listed on the shopping list should be prepared for the customer. For example, the store may include a plurality of courtesy counters. The robot might then drop the shopping list off at the courtesy counter most related to the items being purchased. Additionally, the robot could provide a communication back to the sender of the shopping list providing information regarding when the items will be ready for pickup. Further, as described herein, the robot system provides various interactive features to a customer in a retail environment.

Figure 2:
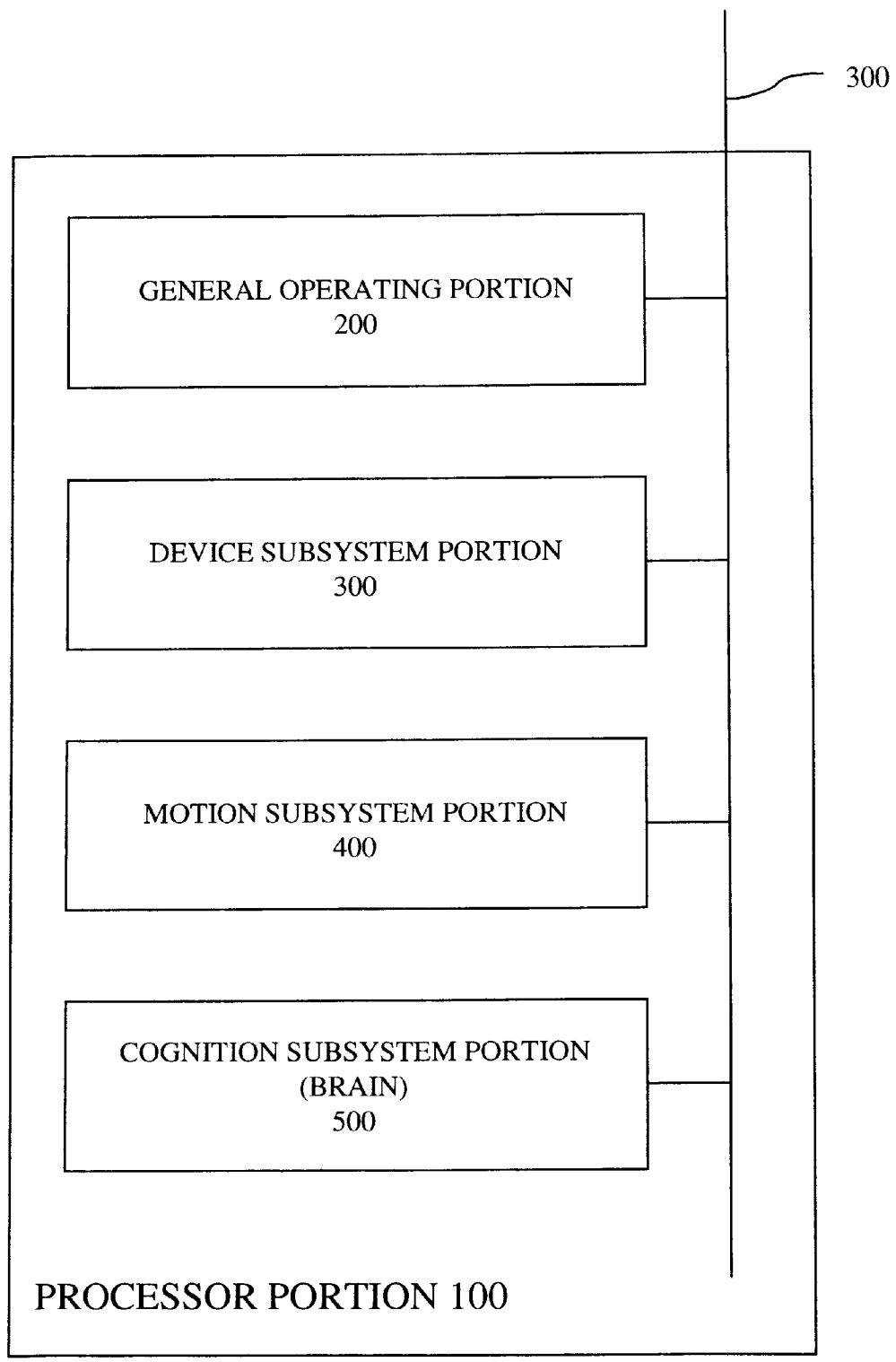
FIG. 2 is a block diagram showing the processor portion of FIG. 1 in further detail in accordance with one embodiment of the system and method of the invention.

Hereinafter, further aspects of the robot system will be described. FIG. 2 is a block diagram showing in further detail the processor portion 100. As shown in FIG. 2, the processor portion 100 includes a general operating portion 200, a device subsystem portion 300, a motion subsystem portion 400 and a cognition subsystem portion 500. The cognition subsystem 500 might be characterized as the "brain" of the robot system 10. The components of the processor portion 100 allow the robot system 10 to interact with customers or other persons and navigate within a retail environment. The general operating portion 200 controls general operations of the processor portion 100 not otherwise handled by the other processor portions. For example, the general operating portion 200 controls system and memory backup operations, virus protection processes and processor multitasking monitoring and control, for example.

The device subsystem portion 300 is responsible for controlling a variety of devices in the interaction portion 700, as well as devices in the customer service device portion 800. Illustratively, such devices in the interaction portion 700 and the customer service device portion 800 may be electrical, electromechanical or mechanical devices. As described further below, these devices include, but are not limited to, sonar sensors, laser sensors, a monitor, joy stick, LED mouth, magnetic strip readers, speakers, touch screens, keypads, a mouse, and motor controllers, for example.

The processor portion 100 also includes a motion subsystem portion 400. The motion subsystem portion 400 monitors and controls various navigational aspects of the robot system 10. Illustratively, the motion subsystem portion 400 determines the position of the robot system 10 in the retail environment and controls navigation of the robot to different positions in the retail environment. Further aspects of the motion subsystem portion 400 are described below with reference to FIG. 4.

As noted above, the processor portion 100 also includes a cognition subsystem portion 500. The cognition subsystem portion 500 is essentially the brain of the robot system 10. The cognition subsystem portion 500 is responsible for all cognitive tasks performed in the robot system 10 including environment interaction, logic processes, and game logic processes, for example.

Figure 3:
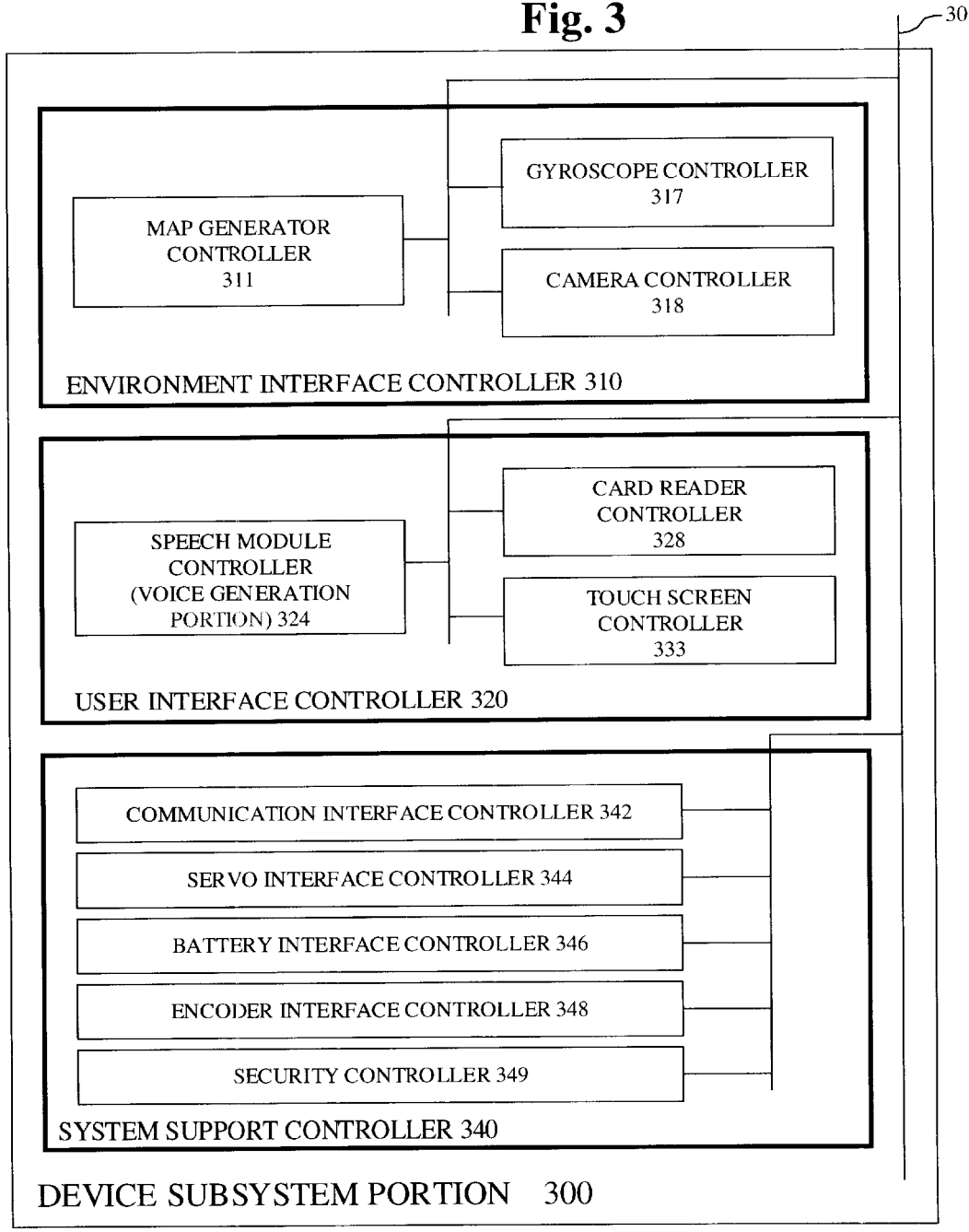
FIG. 3 is a block diagram showing the device subsystem portion of FIG. 2 in accordance with one embodiment of the system and method of the invention.

FIG. 3 shows the device subsystem portion 300 in further detail. As described above, the device subsystem portion 300 controls a variety of devices utilized in operation of the robot system 10. The device subsystem portion 300 includes an environment interface controller 310, a user interface controller 320, and system support controller 340.

The various controllers (310, 320, 340) respectively control operational devices in the interaction portion 700. The environment interface controller 310 in general controls devices utilized to input information regarding the retail environment, as well as to navigate within the retail environment. The user interface controller 320 in general controls a variety of devices utilized to input information from customers and other persons and output responsive information. Further, the system support controller 340 controls a variety of devices, not otherwise controlled by the environment interface controller 310 or the user interface controller 320, that are used in operation of the robot system 10. Further aspects of the controllers (310, 320, 340) will be described with reference to FIG. 6 below.

Hereinafter further aspects of the motion subsystem portion 400 will be described with reference to FIG. 4.

Figure 4:
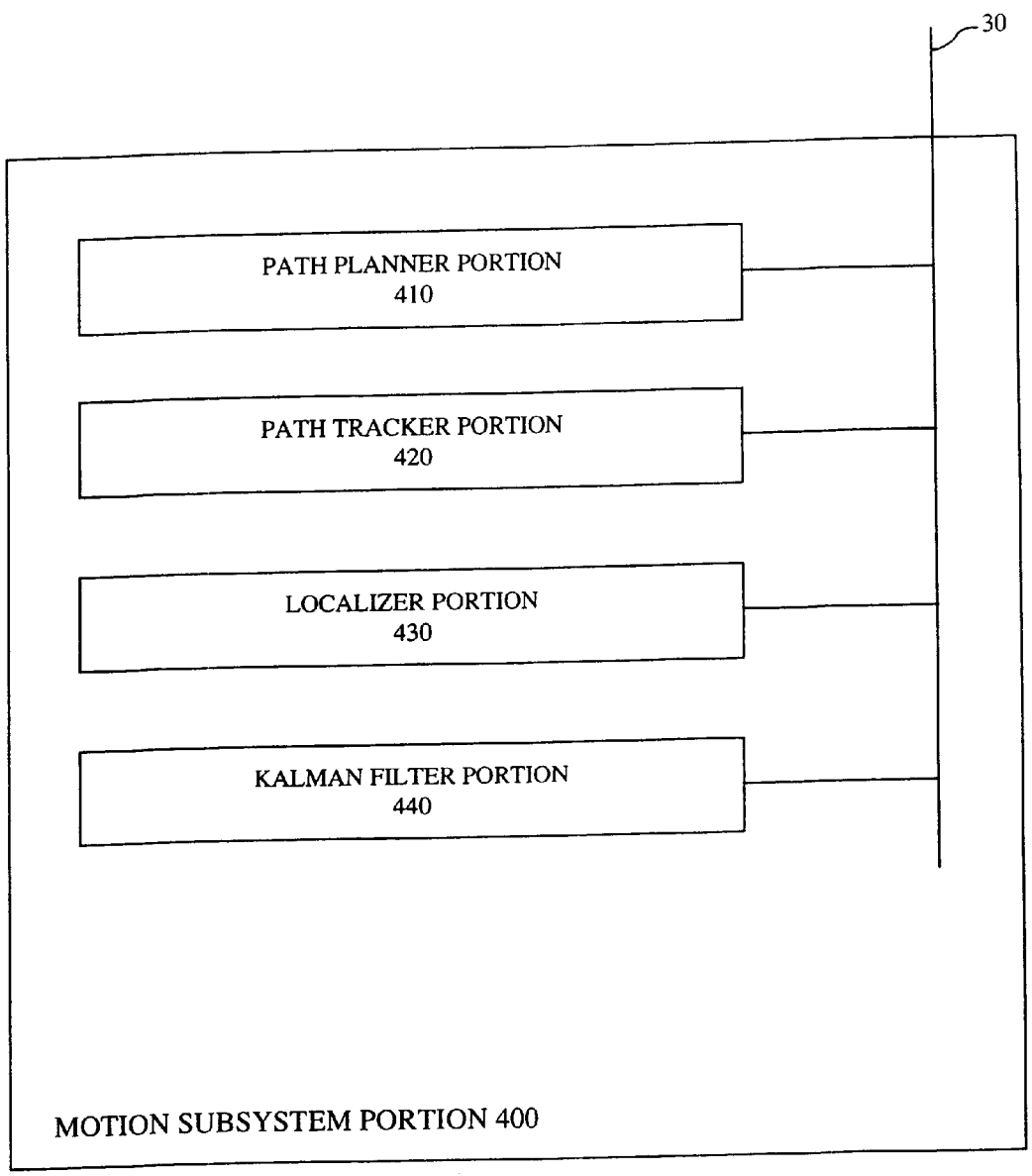
FIG. 4 is a block diagram showing the motion subsystem portion of FIG. 2 in further detail in accordance with one embodiment of the system and method of the invention.

FIG. 4 is a block diagram showing further details of the motion subsystem portion 400. The motion subsystem 400 includes a path planner portion 410, a path tracker portion 420, a localizer portion 430, and a Kalman filter portion 440. As noted above, the motion subsystem portion 400 monitors and controls a variety of navigational aspects of the robot system 10. The localizer portion 430 is responsible for gathering a variety of sensor information. For example, the sensor information may include laser data, sonar data, odometry data, gyroscope data, global position system (GPS) data, pre-stored maps data, and x–y position system, i.e., grid data, for example. This data is input by the localizer portion 430 utilizing devices contained in the interaction portion 700 shown in FIG. 6. Accordingly, the localizer portion 430 determines the position and heading, or "pose", of the robot system 10 in the map of the retail environment in which the robot system 10 is operating.

The path planner portion 410, based on a variety of input, generates a desired path of travel for traveling from a current position of the robot system 10 to a goal position in the retail environment. A suitable algorithm or other logic may be utilized by the path planner portion 410 to generate such a desired path of travel.

Once the path of travel is generated by the path planner portion 410, the path tracker portion 420 utilizes this information. Specifically, the path tracker portion 420 uses the path information from the path planner, as well as the pose information from the localizer portion 430, to control the robot system 10 to move along the desired path to the goal position or pose. The path tracker portion 420 may utilize a suitable logic or algorithm as is necessary or desired.

Alternatively to the localizer portion 430, it should be appreciated that the Kalman filter 440 may be employed by the localizer portion 430 to assist in the prediction of the robot system's pose based on a current sensor position. It should be appreciated that the various software pieces illustrated in the motion subsystem 400 perform separate tasks, as described above. However, it should be appreciated that in another embodiment of the system of the invention, two or more of these respective tasks may be performed by a single processor, or alternatively, the tasks performed by a particular component may be further broken down into multiple processing components.

Figure 5:
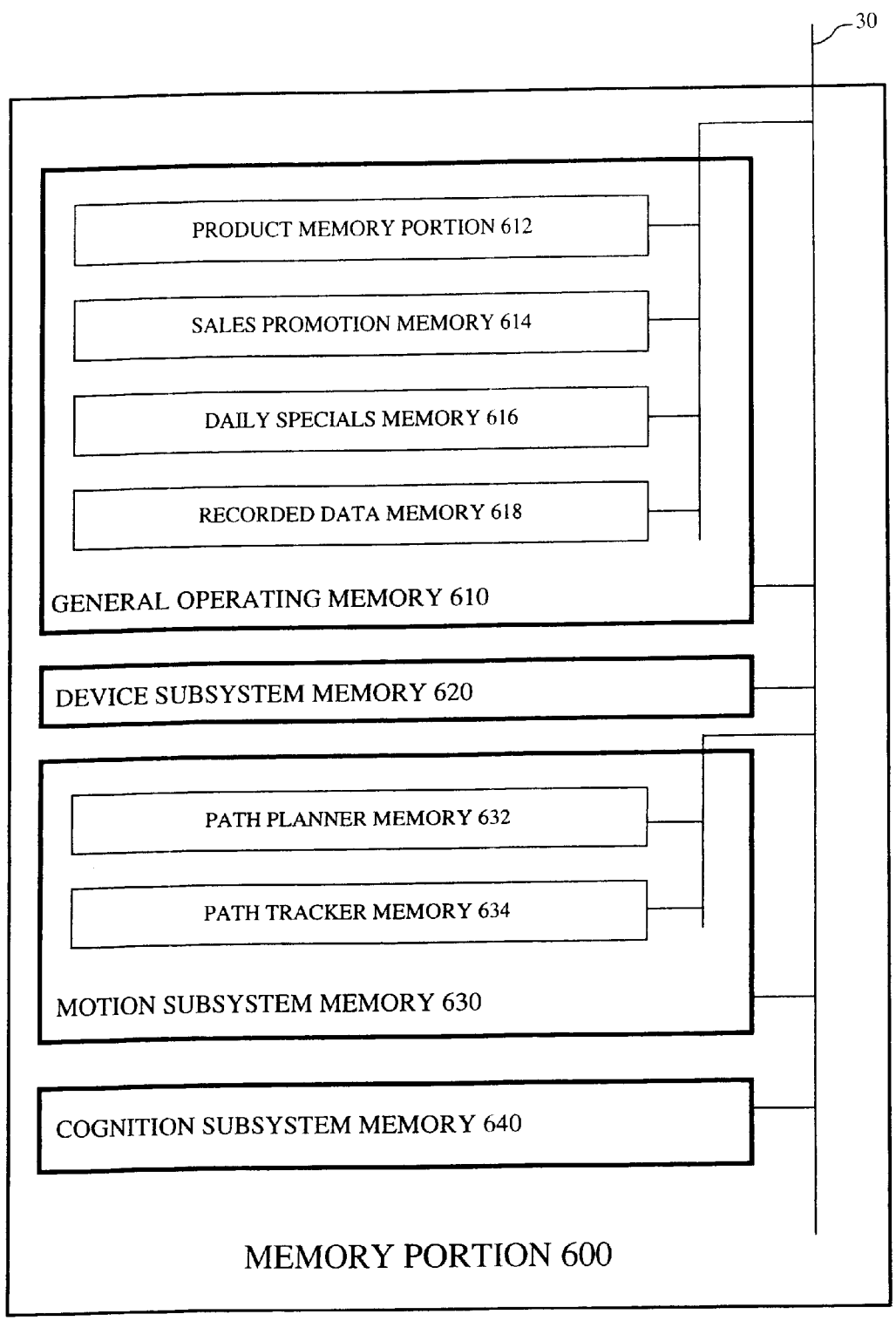
FIG. 5 is a block diagram showing the memory portion of FIG. 1 in further detail in accordance with one embodiment of the system and method of the invention.

As shown in FIG. 1, the control portion 20 in the robot system 10 includes a memory portion 600. The memory portion 600 stores a variety of data utilized in operation of the robot system 10. FIG. 5 is a block diagram showing further details of the memory portion 600.

As shown in FIG. 5, the memory portion 600 includes a general operating memory 610, a device subsystem memory 620, a motion subsystem memory 630, and a cognition subsystem memory 640.

The general operating memory 610 in the memory portion 600 stores a wide variety of data used by the general operating portion 200 in general operations of the robot system 10. Further, the general operating memory 610 contains specialty data stores in accordance with one embodiment of the system of the invention. Specifically, the general operating memory 610 includes a product memory portion 612, a sales promotion memory 614, a daily specials memory 616 and a recorded data memory 618. These data stores contain various information related to the particular retail environment within which the robot system 10 is operating. Illustratively, the product memory 612 may contain data relating to the inventory in the particular retail environment, the location of products in the retail environment, or the price of a particular product. The sales promotion memory 614 may contain a variety of information and other data relating to current sales promotion activities. Similarly, a daily specials memory 616 in the general operating memory 610 may contain a variety of data or other information relating to daily specials in the retail environment. Further, the recorded data memory 618 may store a wide variety of data related to the operations of the robot system 10 as is necessary or desired. While the general operating memory 610 of FIG. 5, as well as the other memories (620, 630, 640) illustrate one embodiment of the system of the invention, it should of course be appreciated that the various memory stores are widely adaptable to the particular operating environment in which the robot system 10 is disposed and may be altered accordingly.

The memory portion 600 also includes the device subsystem memory 620. The device subsystem memory 620 is the memory store utilized by the device subsystem portion 300. Accordingly, the device subsystem memory 620 stores a variety of information related to operation of the devices in the interaction portion 700, which are controlled by the device subsystem portion 300.

The memory portion 600 also includes a motion subsystem memory 630. The motion subsystem memory 630 is the memory store utilized by the components of the motion subsystem portion 400, i.e., the path planner portion 410, the path tracker portion 420, the localizer portion 430 and the Kalmen filter 440. In addition to the general memory stores contained in the motion subsystem memory 630, there are also specialty data stores. Specifically, the motion subsystem memory 630 includes a path planner memory 632 and a path tracker memory 634 utilized by the path planner portion 410 and the path tracker portion 420, respectively.

The memory portion 600 also includes a cognition subsystem memory 640. The cognition subsystem memory 640 serves as the memory store for the cognition subsystem portion 500, which is shown in FIG. 2. Accordingly, the cognition subsystem memory 640 contains a wide variety of data utilized in the cognitive operations performed by the cognition subsystem portion 500. Illustratively, the cognition subsystem memory 640 may contain data associating particular observed inputs with desired outputs.

It should be appreciated that the various memory components contained in the memory portion 600 may take on a variety of architectures as is necessary or desired by the particular operating circumstances. Further, the various memory components of the memory portion 600 may exchange data or utilize other memory component data utilizing known techniques such as relational database techniques.

Hereinafter, further details of the device subsystem portion 300, shown in FIG. 3, will be described in conjunction with the interaction portion 700 shown in FIG. 6. As described above, the interaction portion 700 contains various components to collect information from the retail environment in which the robot system 10 is operating, as well as to output information. The interaction portion 700 includes an environment interface portion 710 (sensor system), a user interface portion 760 and a system support portion 740. The environment interface portion 710 collects various information regarding the retail environment, as well as information regarding travel of the robot system 10 through the retail environment. The user interface portion 760 generally provides customer interaction capabilities. That is, the user interface portion 760 is controlled by the processor portion 100, or components thereof, to interface with a customer including inputting information from customers as well as outputting responsive information. The system support portion 740 contains a variety of operational components of a more general type not contained in either the environment interface portion 710 or the user interface portion 760. Hereinafter, further details of the portions (710, 760, 740) will be described.

Figure 6:
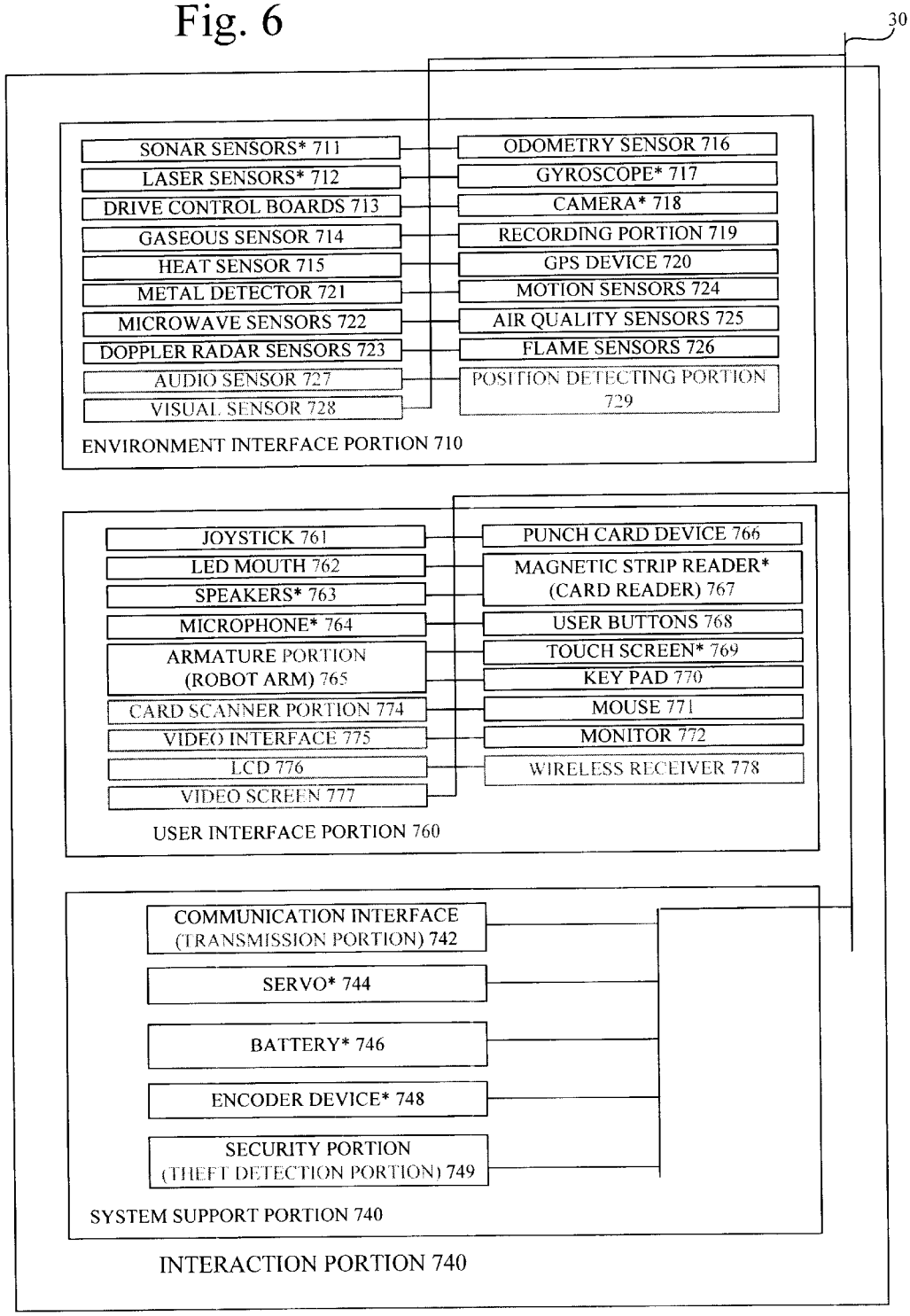
FIG. 6 is a block diagram showing the interaction portion of FIG. 1 in further detail in accordance with one embodiment of the system and method of the invention.

The environment interface portion 710 as shown in FIG. 6, contains a variety of components to input information from the retail environment in which the robot system 10 is operating. Specifically, the environment interface portion 710 includes sonar sensors 711, laser sensors 712, drive control boards 713, a gaseous sensor 714, a heat sensor 715, and odometry sensor 716, a gyroscope 717, a camera 718 and a recording portion 719, a global position (UPS) device 720, metal detector 721, microwave sensors 722, Doppler radar sensors 723, motion sensors 724, air quality sensors 725, as well as flame sensors 726. Environment interface portion 710 also includes audio sensor 727, visual sensor 728, and position detecting portion 729. Further, it should be appreciated that other suitable input devices might be utilized such as an x–y grid device or even a drug sniffing device, for example.

Each of the components in the environment interface portion 710 perform respective operations. The various components in the environment interface portion 710 are in general controlled by the environment interface controller 310. However, the environment interface controller 310 includes therein specialty subprocessing systems that respectively control some of the components in the environment interface portion 710. Specifically, the map generator controller 311 controls and receives feedback from the sonar sensors 711 and the laser sensors 712. Further, the gyroscope controller 317 in the environment interface controller 310 controls the gyroscope 717 in the environment interface portion 710. Further, the camera interface 318 in the environment interface controller 310 controls the physical camera 718 in the environment interface portion 710.

Hereinafter, further aspects of the devices shown in the environment interface portion 710 of FIG. 6 will be described in further detail. As noted above, the environment interface controller 310 monitors and controls the various devices contained in the environment interface portion 710. The environment interface controller 310 controls the gaseous sensor 714. The gaseous sensor 714 may monitor any of a variety of gaseous conditions in a particular retail environment. For example, the gaseous sensor 714 may monitor the amount of carbon monoxide in the air and provide an alert to the environment interface controller 310 if certain conditions are observed. The environment interface controller 310 may then communicate with the user interface controller 320 to alert appropriate persons controlling the retail environment in which the robot system 10 is operating. In addition, the robot system 10 may be programmed to take certain action if a particular gaseous condition in the retail environment is determined. For example, the processor portion 100, utilizing appropriate subprocessing portions, may effect movement of the robot system 10 so as to open a ventilation door, for example. Illustratively, the gaseous sensor 714 may also detect the presence of smoke in the retail environment. Accordingly, during times at which the robot system 10 is not busy attending to interactions with customers, the robot system 10 may do patrols of the retail environment.

Also, the environment interface portion 710 includes a heat sensor 715. The environment interface controller 310 monitors and controls the heat sensor 715. For example, the environment interface controller 310 may set a particular threshold above which temperature the heat sensor 715 provides an alert. Once the threshold is obtained, i.e., the heat sensor 715 detects a sufficiently high temperature in the retail environment, then the heat sensor 715 communicates an alert back to the user interface controller 320. The heat sensor 715, as well as the gaseous sensor 714, may be in the form of any of a variety of known devices to monitor the presence of gases or heat, respectively.

The environment interface portion 710 also includes an odometry sensor 716. The odometry sensor 716 may monitor the distance traveled by the robot system 10 for any of a variety of purposes. For example, the distance traveled by the robot system 10 may be indicative of the level of utilization. Alternatively, the distance traveled might assist in estimations relating to when replenishment of the robot system 10 will be required. The information gathered by the odometry sensor 716, as well as the information gathered in the other components of the environment interface portion 710, may be stored in the device subsystem memory 620 in accordance with one embodiment of the system of the invention.

As shown in FIG. 6, the interaction portion 700 includes a camera 718. The camera 718 is controlled by the camera interface 318, which is depicted in FIG. 3. It should be appreciated that the information gathered from the camera 718, i.e., a visual camera, may be utilized by a variety of systems within the robot system 10. As a result, the information gathered by the camera 718 is processed by the camera controller 318 to prepare the information, i.e., the data gathered, as is desired or necessary. Thereafter, the data gathered by the camera 718 may be output by the camera controller 318 to the appropriate destination for further use.

A recording portion 719 is also included in the environment interface portion 710, as shown in FIG. 6. The recording portion 719 is controlled by the camera controller 318. In accordance with one embodiment of the invention, digital data gathered by the camera 718 may be immediately transferred to the camera controller 318 for processing, whereas the digital data may simultaneously be communicated to the recording portion 719 to effect recording.

The environment interface portion 710 also includes a gyroscope 717. The gyroscope 717 is monitored and controlled by the gyroscope controller 317 in the environment interface controller 310 as shown in FIG. 3. Illustratively, the gyroscope 717 may include a known structure using orientational gyroscope technology, that comprises a spinning mass, the spin access of which is allowed to rotate between low-friction supports so as to maintain its angular orientation with respect to initial coordinates when the spinning mass is not subjected to external torque. Accordingly, the gyroscope 717 provides feedback to the gyroscope controller 317 indicative of movement of the robot system 10. Alternatively, other gyroscope technology may be utilized. For example, tuning fork gyroscope technology might be utilized in conjunction with the system and method of the invention.

The environment interface portion 710 also includes sonar sensors 711 and laser sensors 712. Each of the sonar sensors 711 and the laser sensors 712 are controlled by the map generator controller 311. The sonar sensors 711 and the laser sensors 712 provide the map generator controller 311 with various spatial information regarding the surrounding retail environment. Specifically, the sonar sensor 711 transmits and detects reflected acoustic waves to determine surrounding objects. The sonar sensor 711 in accordance with the system of the invention can detect both static objects, i.e., such as a wall, or dynamic objects such as a moving person. The sonar system 711 conveys gathered information back to the map generator controller 311. Thereafter, the map generator controller 311 outputs the processed information to other components in the robot system as is desired or necessary. Similarly, the laser sensors 712 gather information utilizing laser technology. For example, the laser sensors 712 may include a device that converts incident electromagnetic radiation of mixed frequencies to coherent visible radiation having one or more discreet frequencies. The reflection of this radiation off surrounding objects may be sensed by the laser sensors 712 so as to determine the surrounding retail environment specifics.

As described above, laser sensors, as well as other sensor input devices, may be utilized in the system of the invention. It should be appreciated that this input information might be used in a learning process. That is, the learning process could learn the surroundings of a retail setting, for example, and develop an increasingly enhanced navigational capability in such retail environment. Alternatively, it should be appreciated that a robot in accordance with the system of the invention, might be manually taught regarding the surroundings. That is, data could be input into the robot relating to obstacles in the environment as well as the location of beacons relative to those objects. In addition to a training process or a manual process, other suitable techniques may be utilized to provide navigational capabilities to the robot system.

As described above, the localizer portion 430 in the motion subsystem portion 400, as shown in FIG. 4, is responsible for gathering sensor information and determining the position in heading, or "pose," of the robot system 10. Accordingly, a purpose of the localizer portion 430 is to assist in navigation of the robot system 10 in its travels through the retail environment. The map generator controller 311 assists the localizer portion 430 in its operations. Specifically, the map generator controller 311 forwards information it gathers from the sonar sensor 711 and/or the laser sensors 712 and forwards that information to the localizer portion 430.

The user interface portion 760 as shown in FIG. 6, contains a variety of components utilized to interface with a customer in the retail environment. Specifically, the user interface portion 760 includes a joystick 761, a light emitting diode (LED) mouth 762, speakers 763, a microphone 764, an armature portion 765, i.e., a robotic arm that might possess joints end effectors or fingers, for example, a punch card portion 766, a magnetic strip reader 767, i.e., a card reader, user button 768, a touch screen 769 a keypad 770, a mouse 771, a monitor 772, a card scanner 774, a video interface 775, an LCD 776, a video screen 777, and a wireless receiver 778.

The various components in the user interface portion 760 are controlled by the user interface controller 320 in general, or alternatively, by a subprocessing system of the user interface controller 320. Specifically, the speech module controller 324, i.e., the voice generation component, controls and inputs information from the microphone 764 in the user interface portion 760. Also, the speech module controller 324 outputs data to the speakers 763 so as to provide simulated speech using the speakers, for example. Further, the card reader controller 328 in the user interface controller 320 controls and inputs information from the magnetic strip reader 767. Further, the touch screen controller 333 in the user interface controller 320 controls and inputs information from the touch screen 769.

Hereinafter, further aspects of the user interface portion 760 will be described. As set forth above, the user interface portion 760 includes a variety of devices used to interface with a customer. The devices in the user interface portion 760 are controlled by the user interface controller 320 or a sub-component thereof. With further reference to FIG. 6, the user interface portion 760 includes a joystick 761. The joystick 761 may be disposed on or within the body portion 11 so as to be accessible by a customer. Further, the user interface portion 760 controls a monitor 772. As should be appreciated, the monitor 772 may display a wide variety of information under the control of the user interface controller 320. For example, the monitor 772 may be utilized to display product information obtained by the user interface controller 320 from the product memory portion 612, sales promotion information obtained from the sales promotion memory 614, and/or daily specials information obtained from the daily specials memory 616.

Further, in accordance with one embodiment of the method and system of the invention, the user interface portion 760 includes an LED mouth 762. The LED mouth 762 may be controlled by the user interface controller 320 so as to simulate the movement of lips when a person is talking or text for hearing impaired. Alternatively, it should be appreciated that text might be provided utilizing a touch screen, for example. Such simulation performed by the LED mouth 762 may be performed synchronously with sound generation from the speakers 763, which are also contained in the user interface portion 760.

The user interface portion 760 also contains an armature portion 765, e.g., a mechanical arm. The armature portion 765 may take on any of a wide variety of forms and utilize mechanical or electro-mechanical technology. For example, the armature portion 765 may be constructed of a wide variety of materials including metal, plastic, wood, or fiberglass, for example. Further, the armature may include a variety of devices to effect motion including gears, pulleys and other mechanical components as desired by a particular application. Further, the armature may possess any number of degrees of freedom. Further, the "work envelope or area" of a particular armature, i.e., the area that is accessible by the armature, will of course vary on the structure of the armature. The work envelope and other capabilities of the arm may vary depending on the utility required and cost considerations, for example. For example, an armature portion 765 might be utilized in accordance with one embodiment to retrieve an item from a receptacle on the body portion 11 so as to provide that item to a customer. Alternatively, an armature portion 765 may be required to remove a heavy item from a shelf and place that item in a cart so as to assist an elderly person, for example. Movement of the armature may be accomplished utilizing electrical actuation, hydraulic actuation, or pneumatic actuation, for example.

The user interface portion 760 includes the speaker 763 and a microphone 764. These components are controlled by the speech module controller 324 in the user interface controller 320. The speech module controller 324 inputs information utilizing the microphone 764 and, in accordance with one embodiment, provides voice generation which is output to a customer utilizing the speaker 763. Each of the speaker 763 and the microphone 764 may be suitably disposed on the body portion 11. However, the microphone should be placed in a position to optimize the detection of sound in the retail environment as well as to avoid unnecessary background noise, which may be generated by certain components of the robot system 10. The selection of a particular microphone will depend on a variety of parameters including required sensitivity and cost considerations.

The user interface portion 760 also includes a punch card portion 766 and a magnetic strip reader 767, i.e., a card reader. Alternatively, it should be appreciated that barcode or laser scanners might also be utilized. Each of the punch card portion 766 and the magnetic strip reader 767 are controlled by the card reader controller 328. Each of the punch card portion 766 and the magnetic strip reader 767 may read a particular customer's card. As a result, the customer's identity may be determined by the robot system 10 and various predetermined options may be presented to the particular customer. For example, the customer may have a customer ID number at the retail environment. Further, in accordance with one scenario, the customer may have e-mailed a grocery list to the retail environment. The e-mailed grocery list is input by the communication interface 742, described above. Accordingly, once the identity of the particular customer is determined by the card reader controller 328, the grocery list may then be printed utilizing the printing portion 850. Alternatively, the dispensing of cash or other services may be presented to the particular customer based on the read identity of the customer.

The user interface portion 760 also includes a touch screen 769 that is controlled by a specialized processing component in the user interface controller 320. Specifically, the touch screen 769 is controlled by the touch screen controller 333. A customer may use the touch screen 769 to input information into the robot system 10.

Further, the user interface portion 760 includes user buttons 768, a keypad 770, and a mouse 771. Each of these additional components may be utilized to input a wide variety of information into the robot system 10.

Further, the user interface portion 720 includes user buttons 732, a keypad 735, and a mouse 737. Each of these additional components may be utilized to input a wide variety of information into the robot system 10.

The system support portion 740 as shown in FIG. 6 includes a variety of components used to support operation of the robot system 10. Specifically, the system support portion 740 includes a communication interface 742, a servo 744, a battery 746, an encoder device 748 and a security portion 749.

The devices in the system support portion 740 are controlled by respective processing components in the system support controller 340. That is, the communication interface controller 342 controls operation of the communication interface 742. The servo interface controller 344 controls operation of the servo 744. Further, the battery interface controller 346 controls operation of the battery 746. The encoder interface controller 348 controls operation of the encoder device 748. Lastly, the security controller 349 controls the security portion 749.

Hereinafter, further aspects of the components in the system support portion 740, as shown in FIG. 6, will be described. The system support portion 740 includes the communication interface 742. The communication interface 742 is controlled by the communication interface controller 342, as shown in FIG. 3. The communication interface 742 provides for transmission of data both to the robot system 10 and from the robot system 10. In accordance with one embodiment of the invention, the communication interface 742 is a wireless device. Various communications techniques may be utilized to provide the wireless transmission both to and from the robot system 10, including radio, spread spectrum, infrared line of sight, cellular, microwave, or satellite, for example. Further, the communication interface 742 may use wire technology wherein a physical cable is running from the robot system 10 to a desired location, such as a modem which may then be connected to the Internet, for example. In particular, the wire technology may be utilized where the robot system 10 is operated in a small defined area.

The system support portion 740 also includes a battery 746. The battery 746 is monitored and controlled by the battery interface controller 346. The battery 746 may be any suitable type including lithium polymer, nickel cadmium, nickel hydride, lead acid, lithium ion, lithium polymer, zinc air or alkaline, for example. Further, it should be appreciated that a plurality of batteries may be utilized that are the same or different types. This may be preferable in that various processing systems and operational devices utilized on the robot system 10 may optimally utilize different types of batteries for enhanced performance. The battery interface controller 346 monitors the battery 746, or alternatively batteries, for possible malfunctions and recharging requirements. Once the battery interface controller 346 determines that a battery 746 requires recharging or replacement, the battery interface controller 346 works in conjunction with the other processing portions and devices to effect travel of the robot system 10 to a recharging station, in accordance with one embodiment of the invention.

The system support portion also includes a security portion 749 that is controlled by the security controller 349 in the system support controller 340. The security portion 749 working in conjunction with the security controller 349 provides various capabilities related to security of both the retail environment as well as the robot system 10 itself. For example, the security portion 749 may provide theft detection capabilities. Such capabilities may be provided in a variety of forms depending on the particular retail environment and the cost considerations, for example. For example, the security portion 749 may include a proximity sensor that interacts with a base station, an embodiment of which is described below. As a result, once the robot system 10 is a predetermined distance away from the base station various operations may be performed such as sounding an audio alarm, electronically transmitting a signal to close exit ways, or effecting certain mechanical operations such as locking wheels of the robot system 10 so as to hinder transport.

Further, it should be appreciated that the processing capabilities of the security controller 349 may also utilize input devices controlled by the environment interface controller 310 and the user interface controller 320. For example, the security controller 349 might be alerted to questionable behavior by a particular customer such that that customer would thereafter be monitored so long as the customer is in the retail environment. In addition, the security controller 349 may direct that a communication or message, describing an emergency condition, be dispatched to an emergency services provider, such as the police, fire department or building manager. Accordingly, if the robot system 10 detected a burglar in the retail environment, the security controller 349 could alert the police department of the break-in while the burglar is being monitored. This monitoring is controlled by the security controller 349, working in conjunction with the other processing systems.

Figure 7:
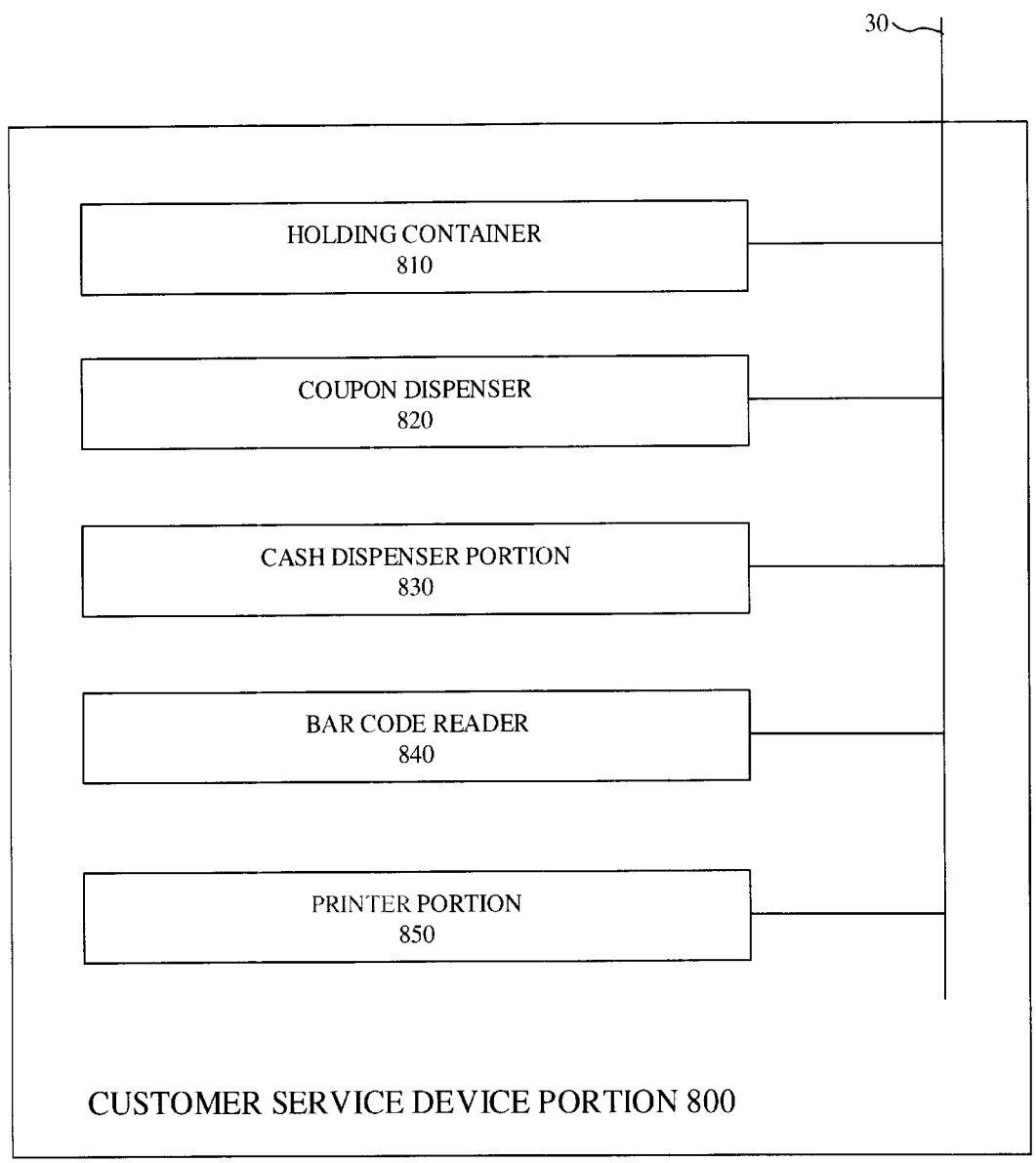
FIG. 7 is a block diagram showing the customer service device portion of FIG. 1 in further detail in accordance with one embodiment of the system and method of the invention.

As described above, FIG. 1 includes a customer service device portion 800 in accordance with one embodiment of the system and method of the invention. FIG. 7 is a block diagram showing the customer service device portion 800 in further detail. In general, the customer service device portion 800 includes various operational components providing additional capabilities to the robot system 10. In accordance with this embodiment of the invention, the components in the customer service device portion 800 provide feedback to the device subsystem portion 300, which monitors and controls operation of the components of the customer service device portion 800.

In accordance with one embodiment of the system and method of the invention, the customer service device portion 800 includes a holding container 810, a coupon dispenser 820, a cash dispenser portion 830, a barcode reader 840, and a printer portion 850.

The holding container 810 is a physical container that is disposed on the robot system 10 in accordance with one embodiment of the invention. For example, the holding container 810 may be disposed on or within the body portion 11 so as to be accessible by a customer. As should be appreciated, the holding container 810 may be used to hold a wide variety of items for retrieval by customers. For example, the holding container 810 might hold a selection of foodstuffs or a collection of compact disks, for example. As noted above, the holding container 810 as well as the other components in the customer service device portion 800, provide feedback to the device subsystem portion 300. With regard to the feedback provided by the holding container 810, a sensor or sensors may be disposed in the holding container 810 to monitor the quantity of items disposed in the holding container 810. Accordingly, once such sensors in the holding container 810 convey feedback to the device subsystem portion 300 that the quantity of items is sufficiently diminished, then the device subsystem portion 300 may effect a desired action. For example, the device subsystem portion 300 may effect travel of the robot system 10 to a predetermined location such that the contents of the holding container 810 may be replenished.

The customer service device portion 800 also includes a coupon dispenser 820. In a manner similar to the holding container 810, the coupon dispenser 820 may be disposed on or within the body portion 11 of the robot system 10 so as to be accessible by a customer. The coupon dispenser 820 may be utilized to dispense any of a wide variety of coupons or other promotional written materials to customers. In accordance with one embodiment, the device subsystem portion 300 monitors the contents of the coupon dispenser 820. Once the contents of the coupon dispenser 820 are sufficiently depleted, the device subsystem portion 300 effects travel of the robot system 10 to a predetermined location for replenishment of the coupon dispenser 820, i.e., in a manner similar to replenishment of the holding container 810.

The customer service device portion 800 also includes a cash dispenser portion 830. The cash dispenser portion 830 may also be located on or disposed within the body portion 11. The cash dispenser portion 830 may dispense cash to a customer in a manner similar to known automated teller machines (ATMs). Replenishment of the cash dispenser portion 830 may be performed in a manner similar to the holding container 810 or the coupon dispenser 820. As should be appreciated, the utilization of the cash dispenser portion 830, in particular, raises concerns regarding theft of the robot system 10. These concerns are addressed by operation of the security portion 749, as described herein.

The customer service device portion 800 also includes a barcode reader 840. The barcode reader 840 is utilized to input information from a customer from a printed code, which is physically held by the customer. The data input by the barcode reader 840 is output to the device subsystem portion 300 for processing. As a result, the device subsystem portion 300 may perform a variety of operations. For example, the printed code read by the barcode reader 840 may determine the identity of a customer. Based on the identity of the customer, the device subsystem portion 300 may output various information to the customer utilizing the devices in the interaction portion 700 or in the customer service device portion 800. For example, the device subsystem portion 300 may output a grocery list using a printer portion 850.

Further, it should be appreciated that the customer service device portion 800 may also include a scanner for scanning a product. That is, a customer may hold product identification information in front of the scanner such that the robot system 10 displays price information, for example.

As should be appreciated, the printer portion 850 may take on a variety of forms and be any number of devices for printing desired information onto a material medium, such as paper. The printer portion 850 may be disposed on the body portion 30 of the robot system 10 as is desired. Further, it should be appreciated that the device subsystem portion 300 may otherwise output information to a customer. For example, the device subsystem portion 300 may output requested information to a hand held computer utilizing a suitable interface, such as an infrared interface.

As described above, the robot system 10 includes a transport portion 900. The transport portion 900 is controlled by the device subsystem portion 300. In summary, the device subsystem portion 300 inputs various information from the interaction portion 700 including customer requests and information regarding the layout of the retail environment, for example. As a result, in some operations the robot system 10 is required to move from a first location to a second location. Working in conjunction with the motion subsystem portion 400, the device subsystem portion 300 utilizes the transport portion 900 to effect this movement of the robot system 10.

Figure 8:
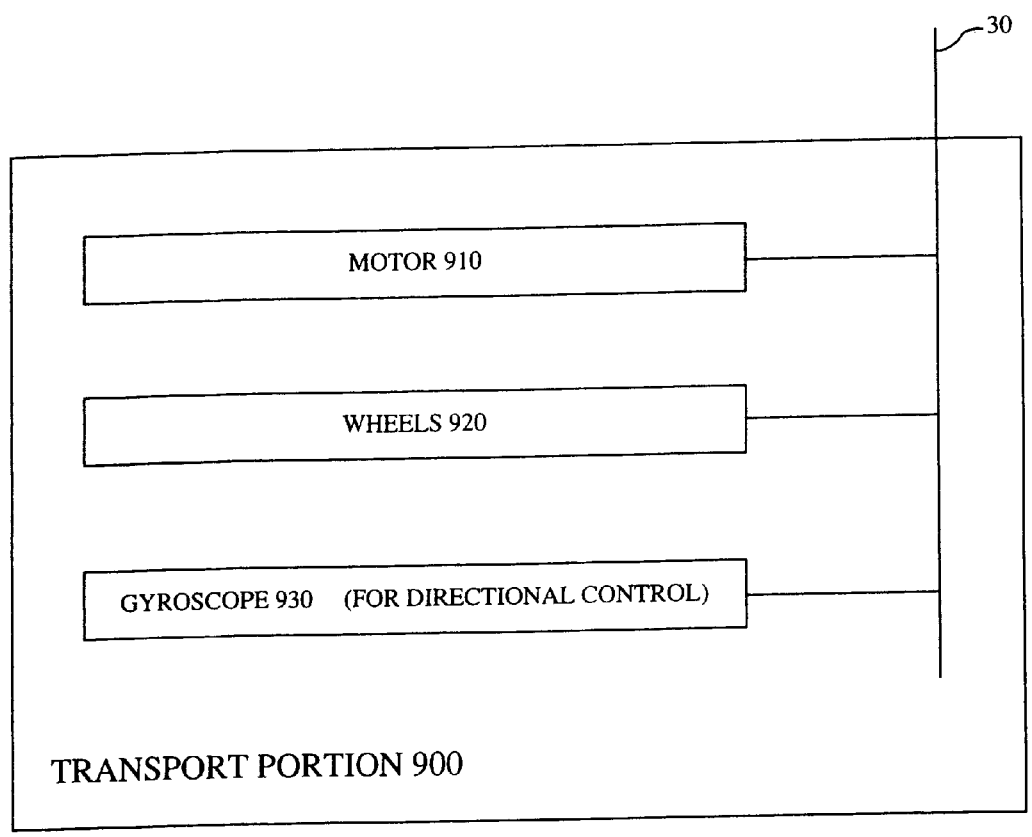
FIG. 8 is a block diagram showing the transport portion of FIG. 1 in further detail in accordance with one embodiment of the system and method of the invention.

The transport portion 900 as shown in FIG. 8 controls various mechanical or electro mechanical components needed to effect physical movement of the robot system 10. Specifically, the transport portion 900 includes a motor 910 used to drive the wheels 920. The motor 910 may be powered by the battery 746. Further, various directional devices and sensors may be utilized as is needed or desired. For example, the transport portion 900 may utilize a gyroscope 930 to monitor and control the direction of travel of the robot system 10.

Hereinafter further aspects of the software architecture will be described relating to operations performed by the cognition subsystem portion 500, i.e., the "brain," in the processor portion 100. In accordance with embodiments of the system and method of the invention, the processes utilized by the cognition subsystem portion 500 provide a high level of cognitive control. For example, the processes utilized provide easy replacement or modification of higher level tasks performed by the robot system 10 such as "take to product" or "hide and seek," gives the robot a sense of "uncertainty" as to what the robot will do to make physical operations observed by a customer more life-like and interesting, and keeps the central architecture of the robot organized. Hereinafter different concepts of the architecture utilized in embodiments of the system and method will be described, starting with the lowest level.

There are various operations performed by the robot system 10. One type of operation may be characterized as an "action." An action is an open-loop instantaneous operation that the robot may be commanded to perform. An action may relate to movement or manipulation of eyebrows, eyelids, ears, eyeballs or mouth, for example. Actions are open-loop meaning that the particular action may be performed multiple times as is desired or necessary. As a result, commanding the robot to move to a new location, for example, is not considered an "action." It should be appreciated that operation of the robot system 10 also includes various closed-loop operations, such as moving to a new location, which are not considered actions and are therefore handled by what is herein characterized as "scripts."

Figure 9:
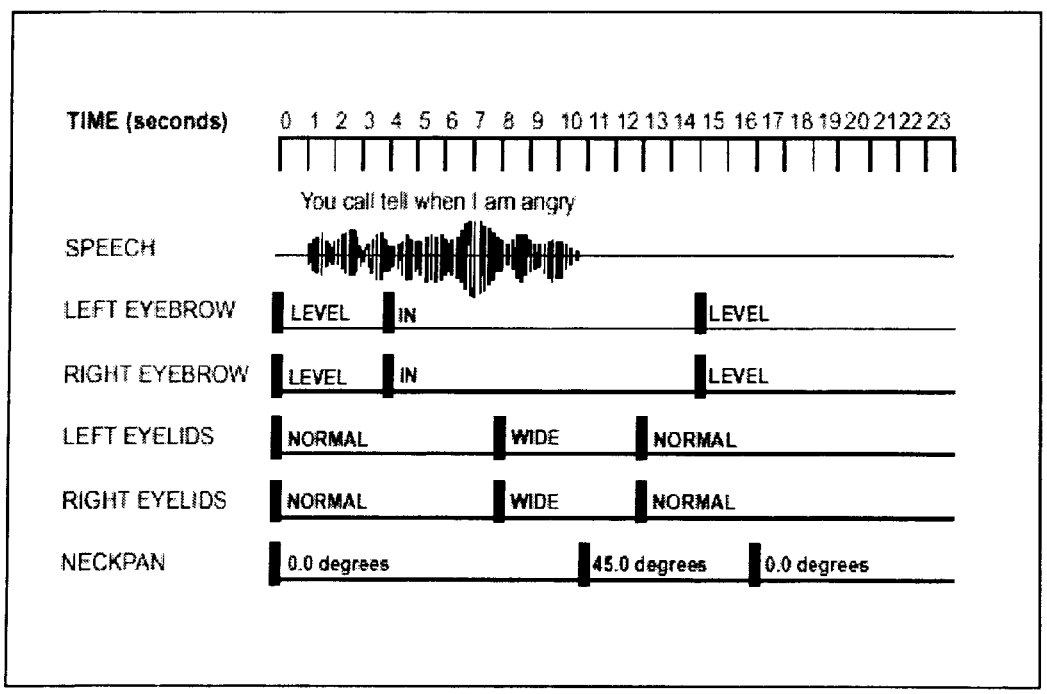
FIG. 9 is a diagram showing the coordination of actions within expressions in accordance with one embodiment of the system and method of the invention.

Further, the robot system 10 may be characterized as performing both "expressions" as well as "actions." An "expression" defines which actions are performed over a discrete period of time. In other words, an expression is used to coordinate actions over a specified period of time. For example, it may be desired to have the robot system 10 say the phrase "You can tell when I am angry!" Further, it may be desired to turn the eyebrows when the robot system robot system 10 says "tell" and open the eyes wide when the robot system 10 says "angry!" Further, after saying the phrase, it may be desired that the robot system 10 turn its neck left, and then six seconds later turn the robot system's neck back to the forward position. FIG. 9 is a diagram illustrating the coordination of actions within an expression. As shown in FIG. 9, the actions may be controlled by the cognition subsystem portion 500 based on a timeline, in accordance with one embodiment of the invention.

In further explanation of the system and method of the invention, FIG. 10 is a table showing further aspects of actions. In the programming utilized in one embodiment of the system and method of the invention, a particular action may be associated with a particular "action command" as shown in FIG. 10. The action command is the identifier the cognition subsystem portion 500 uses to identify a particular action. For example, the identifier may be "eyebrows" or "eyelids," for example. Further, it should be appreciated that various "modifiers" are utilized in conjunction with a particular action command as is also shown in FIG. 10. Illustratively with respect to "eyebrows" the primary modifier includes "in, out, level." Accordingly, in this case, the primary modifier controls the physical in or out position of the eyebrows. Further, the secondary modifier controls whether movement of the eyebrows is fast or slow. Lastly, the tertiary modifier controls which eyebrow is moved, i.e., the left, right, or both eyebrows.

It should be appreciated that expressions may be stored in any suitable manner so as to be accessible for utilization by the cognition subsystem portion 500. For example, a particular expression may be stored using "expression files" with a suffix ".EXP". In accordance with one embodiment of the system and method of the invention, the "expression files" may include a duration parameter. More specifically, the duration parameter is the nominal duration of the expression in fractional seconds, for example, plus or minus a "duration modifier". The duration and duration modifier allow expression files to be very flexible in accordance with the invention. Further, expressions may be of fixed length or random length. A fixed length expression lasts a predetermined period of time. However, random expressions are not of a fixed length.

Moreover, the length of a random expression will not be known until that random expression is executed. That is, the potential duration of the expression is specified, but the actual performed duration of the expression changes. In other words, a window of time duration is programmed such that the action may take the minimum amount of time defined by the window, or alternatively, the maximum amount of time. This variation may be effected by a random variable controlling the magnitude of the duration modifier. Accordingly, by utilizing random expressions, the actions of the robot system 10 as controller by the cognition subsystem portion 500 will appear to be unpredictable. As a result, the robot system 10 will appear to a customer as being more humanistic and nondeterministic.

The expression files may also contain time-stamped action commands. To explain, there are two types of actions in accordance with one embodiment including "deliberate actions" and "random actions." A deliberate action is an action that takes place at a deliberate time with deliberately selected modifiers. A random action is an action that takes place at a random time with randomly selected modifiers.

In accordance with one embodiment of the system and method of the invention, an "expression list" may be utilized. Specifically, an expression list is a list of similar expressions that may be effected by the cognition subsystem portion 500. The purpose of an expression list is to make the robot seem unpredictable. For example, the robot system 10 may be programmed to play games with children in the retail environment. The robot system 10 might play the traditional game of "hide and seek" while working on the promotion of a particular product. It should be appreciated that if every time the robot system 10 started playing "hide and seek" the robot system 10 said "let's play hide and seek", the unpredictable consistency of such a phrase could become boring very quickly. However, in accordance with one embodiment of the invention, when the cognition subsystem portion 500 determines that it is time to play the traditional hide and seek game, the robot system 10 commands a suitable audio device, such as using speakers 723 described above, to articulate one of a plurality of things to convey this one conceptual point. That is, the robot system 10 chooses between three different sayings, for example, including "hey, want to play hide and seek?", "hide and seek! my favorite game!", and "let's play hide and seek!". Accordingly, operations of the robot system 10 appear more life-like and less predictable, and consequently more humanistic and interesting. It should be appreciated that any number of different sayings might be utilized to express the same main point.

In further explanation of the expression list, when it is time for an expression to be executed by a suitable audio device, for example, the cognition subsystem portion 500 selects which expression, from a specified list, should be executed. For example, the cognition subsystem portion 500 may initially select the first expression in the list and thereafter proceed downward returning to the first expression once the last expression in the list is utilized. It should further be appreciated that the expression lists utilized by the cognition subsystem portion 500 is not limited to sayings or speech. That is, an expression list might be utilized to control the physical operation of arms of a robot. For example, once the child finds the robot in the above described "hide and seek" game, the robot may perform varying arm movements based on the cognition subsystem portion 500 proceeding through the various entries in the expression list controlling operation of the arms. Further, the cognition subsystem portion 500 may select the particular entry in an expression list in a random manner, as opposed to simply proceeding top to bottom, for example.

Hereinafter, further aspects of operation of the robot system 10 will be described. In operation, the cognition subsystem portion 500 utilizes what might be characterized as "script commands." A script defines the highest level of logic utilized by the cognition subsystem portion 500. For example, a script command used by the cognition subsystem portion 500 may relate to one of the expressions located in an expression list file; commanding the robot system 10 to move to a location, where the location is defined by x–y location and heading; commanding the robot to rotate to a particular heading; or starting and stopping a game.

The cognition subsystem portion 500 also utilizes "triggers," in accordance with one embodiment of the methods and systems of the invention, in its operations. A trigger in accordance with one embodiment of the invention is an input which can either be ignored or cause a new script to be invoked. Further, scripts invoked by a trigger may either interrupt or replace the current script being executed by the cognition subsystem portion 500. There are four classes of triggers in accordance with one embodiment of the system and method of the invention, including hardware triggers, software triggers, graphical user interface (GUI) triggers and time triggers.

Hardware triggers are inputs that originate from hardware devices and are transmitted to the cognition subsystem portion 500. Illustratively, the hardware triggers on the robot system 10 may include e-stop switch position, drive mode switch position, lower torso bumpshield, battery level, card reader, sonar device, or laser device, for example.

Further, software triggers are messages that originate from other software modules contained within the cognition subsystem portion 500. For example, the software triggers utilized may include a no path trigger, meaning that no path is available from the present location to an objective location; a path blocked trigger meaning that a once available path is now blocked; a robot position, location and localization trigger; a resuming motion trigger; a done rotating trigger; an at goal trigger; a person detected trigger; a detection area all clear trigger and a touch screen touched trigger. Such exemplary software triggers may be utilized in conjunction with each other and/or in conjunction with other triggers.

Other triggers relate to the graphical user interface (GUI) utilized by the robot system 10. Accordingly, these triggers may be characterized as GUI triggers. GUI triggers are dynamic internal triggers that are defined according to which GUI screen is currently being utilized by the cognition subsystem portion 500, for example. These internal triggers are activated based on the user input information being supplied by a processing portion handling the graphical user interface.

Further, the cognition subsystem portion 500 utilizes "time triggers." Time triggers are timers, in accordance with one embodiment, that expire after a certain amount of time has gone by or an absolute time is reached. That is, a "relative time trigger" may be set, or an "absolute time trigger" may be set. When the timer expires, the corresponding trigger is activated. In accordance with one embodiment, relative timers are set in scripts, whereas absolute timers are specified in the initialization file utilized during start-up of the robot system 10. If a relative timer expires, the cognition subsystem portion 500 deletes that timer, whereas absolute timers remain even after triggering. In further explanation, an absolute timer might go off a running clock, for example. In contrast, a relative timer may be triggered by a particular event. For example, an individual may walk up to a robot and start a relative timer defining a time period in which the robot will interact with the customer. A sequence of movement may be controlled by a relative timer.

It should be appreciated that an operation corresponding to a particular trigger detected by the cognition subsystem portion 500 may be processed in a hierarchical manner. That is, a particular trigger may override an operation currently being performed, or alternatively, may be delayed until the present operation is terminated. Alternatively, a particular trigger, in accordance with one embodiment of the methods and systems of the invention, may simply be ignored by the cognition subsystem portion 500 if certain conditions are present.

As described above, the cognition subsystem portion 500 utilizes various scripts in its operations. In accordance with one embodiment, the only way that a current script can be interrupted is by a trigger occurring. Further, when a current script is interrupted by a new script, i.e., by an action mapped to that particular trigger, the state of the current script must be remembered. The cognition subsystem portion 500 remembers the state of the current script by placing the current script information into a stack. Once the current script is placed on the stack, the new script information is loaded into memory and becomes the new current script.

Once the new current script is completed, there are two mechanisms for returning to the earlier script, in accordance with one embodiment of the system and method of the invention. First, a "return" may be utilized in the new script. That is, the command "Return" can be employed within a script to indicate that the particular script has finished executing such that the cognition subsystem portion 500 should return to the script on the top of the stack. Secondly, a trigger may cause the current script to terminate. As a result of this termination of the current script, i.e. the new script, the cognition subsystem portion 500 returns to processing of the script on the top of the stack.

As described above, the robot system 10 includes a touch screen 769, which provides a graphical user interface (GUI). The graphical user interface is a device that utilizes separate passive process that performs two functions. These two functions include: (1) display of images on the touch screen as controlled by the cognition subsystem portion 500, and (2) informing the cognition subsystem portion 500 of the location of any touches on the touch screen 769. In accordance with one embodiment, all logic is removed from the graphical user interface, i.e. the touch screen 769. As a result, a clean division of the robot system's "brain" and the graphical user interface operation, i.e., the operation of a device, is achieved.

In operation, the cognition subsystem portion 500, working in conjunction with the touch screen controller 333, displays images on the touch screen 769. Further, a corresponding file is accessed by the cognition subsystem portion 500 which defines the graphical user interface triggers associated with the displayed images. These files may be characterized as "button map files" in accordance with one embodiment of the method and system of the invention. In accordance with the system and method of the invention, the button map files provide two capabilities related to the touch screen 769. First, the button map files allow a programmer to define the "hot spots" on the touch screen that correspond to displayed buttons. Secondly, sub-images may be drawn on the touch screen using the button map file.

Illustratively, the cognition subsystem portion 500 defines a "hot spot" on the touch screen by displaying an image upon the hot spot and remembering the screen coordinates of the hot spot. Accordingly, the cognition subsystem portion 500 can sense a touch within the boundary of the hot spot utilizing touch sensitive technology. For example, the touch screen may utilize a matrix of cells that allow for the detection and transmission of pressure information to the cognition subsystem portion 500. The matrix of cells may include a system of electrical elements in which the electrical resistance is varied upon deformation of those electrical elements by the physical touch of a human user, for example.

Upon the sensing of a touch, the cognition subsystem portion 500 executes a predetermined script. Further, the cognition subsystem portion 500 retrieves information from memory indicating the manner in which the script should be invoked. For example, the type of the trigger may be either a "interrupt" or a "replace" trigger indicating whether the new script should interrupt or replace the current script being executed.

Hereinafter, further aspects of operation of the robot system 10 will be described relating to orientation of the robot system 10 within a retail environment. In accordance with one embodiment of the system and method of the invention, the cognition subsystem portion 500 utilizes "nodes." To explain in a particular retail environment there are a variety of locations that the human operator of the retail environment may want information associated with. These special locations are called "nodes." Illustratively, there may be four types of nodes. These types include a home node, a product node, a hidden node and an unlabeled node.

Home nodes are key locations in a store, for example, where the robot system 10 can be expected to "hang out."

These home nodes may be the front of a store, near an entrance or near an information booth, for example. Further, product nodes represent all the locations of products in the store. Also, hidden nodes may be utilized by the cognition subsystem portion 500 to represent the locations of good hiding places in the store, such as for use with the "hide and seek" game. It should be appreciated, for example, that the hidden nodes may be creatively used to promote a particular product. Thus, the hidden nodes may be utilized in conjunction with the product nodes. Accordingly, once a child finds the robot system 10 at a particular hidden node, the robot system 10 may then articulate product information depending upon the particular product node at which the robot system 10 is positioned.

Further, unlabeled nodes represent all other nodes in the store or other retail environment. Accordingly, the nodes might be characterized as follows: home nodes are popular locations in the store, hidden nodes are unpopular locations in the store, product nodes are where the products are located, and unlabeled nodes are locations where there is information associated with the location, but that has no other connotation.

In accordance with one embodiment, during start-up of the robot system 10, all nodes for the particular environment are loaded into the operating memory. Every node must have a two dimensional pose, i.e., (x, y) coordinates and a heading associated with it. Similarly, every node must be labeled as either home, product, hidden, or unlabeled in accordance with this embodiment.

Further, a wide variety of commands and operations may be associated with a particular node or with a particular type of node. Thus, for example, when the robot system 10 is positioned at a home node, the robot system 10 may perform a variety of greeting operations. However, even at the same type of node, the robot system 10 may perform different operations. For example, the robot system 10 would perform a different voice generation operation, if prompted for directions to the dining center, depending on whether the robot system 10 was positioned at the rear entrance of the store or the front entrance of the store, for example.

Hereinafter additional features in accordance with further embodiments of the method and system of the invention will be described. It should be appreciated that the various features and embodiments described herein may be utilized in combination with a variety of known technology. For example, the above features and embodiments may be used in conjunction with the features described in U.S. Pat. No. 5,548,511, which is incorporated herein by reference in its entirety. Further, it should be appreciated that the various embodiments and features described herein may be used in conjunction with features in related U.S. patent application Ser. No. 09/906,159, Attorney Docket No. 55274.000018, which is incorporated herein by reference in its entirety.

In accordance with one embodiment of the system and method of the invention, the robot system 10, using one or more of the sensors described above, may monitor the position of a customer or other person's body part, and in particular, the customer's head. In other words, this operation performed by the robot system 10 might be characterized as "face tracking." For example, the sensors on the robot system 10 may distinguish between a facial skin surface and a clothing surface, for example.

In accordance with one further embodiment, the robot system 10 may perform operations of a stationary kiosk, such as in a store or mall, for example. That is, the robot system 10 operates as a mobile kiosk offering a variety of features and functions that a traditional stationary kiosk would perform. Accordingly, the robot system 10 may provide greeting features to customers, as well as distribution of a wide variety of information.

It should be appreciated that a wide variety of interactions may be performed between different robots in accordance with the method and system of the invention. The robots may be in communication utilizing any suitable wireless technology, for example, such as a gateway. For example, one robot could be showing a customer to the Barbie area, while another robot is showing a different customer to the bicycle area. At a predetermined time, the robots might communicate with each other to determine if each robot is done with their respective tasks of showing the Barbie area and the bicycle area. If both robots are done with their respective tasks, then both robots rendezvous for a "hide and seek" game. Additionally, a first robot working in the Barbie area might be aware that a second robot is working in the bicycle area such that the first robot working in the Barbie area could refer a customer to the second robot.

Additionally, it should be appreciated that one robot might communicate with multiple other robots. For example, one robot, while busy with a first customer, might be queried from a second customer. As a result, that robot might communicate with the fleet of robots in the retail environment to determine which robot in the fleet is available to help the second customer. As noted above, a gateway might be utilized to route communication between the robots. The gateway might be characterized as a traffic controller or a coordinator between the various robots.

In accordance with a further embodiment of the system and method of the robot, it should be appreciated that a particular robot may be guided by a device, such as a mouse, in a remote location. To explain, it should be appreciated that a camera mounted upon the robot may input information using the camera and communicate that visual information to a distant location, where a human operator is monitoring and controlling movement of the robot. Thus, using a mouse or other suitable device, the operator may control movement of the robot through a particular retail environment and obtain visual information based on the travels of the robot. Illustratively, a particular company may buy an amount of use-time of the robot. This use-time might be at night, for example. During the use-time, the purchasing company might use the robot to determine the placing of its products on shelves in the particular environment, i.e., whether the products are at eye level, for example. In this manner, a company may confirm that an agreed upon display location is indeed being used. It should be appreciated that, in this manner, a company may monitor the product placement in each store in which a robot is located from one central location. For example, a particular company may buy twenty minutes of time each night to perform such exploratory activity.

In accordance with a further embodiment of the system and method of the invention, a customer, and in particular a child, may interface with the robot while at home. Illustratively, a potential consumer "Johnny", working at his computer at home might e-mail or otherwise communicate with a robot in a retail environment. The robot may be programmed to provide a suitable response such as "Hi, Johnny, I'm really busy today at the store and can't chat, but look forward to seeing you next time." Further, the robot might possess data regarding children's birthdays. As a result, the robot might e-mail the child at home regarding his birthday so as to develop a potentially beneficial relationship between the robot and the child. Of course, appropriate considerations should be taken into account such as parental authorization as is necessary.

Also, it may be beneficial for customer relations to generate an output on the robot itself regarding a birthday, for example. Thus, the robot could generate the display "Today is Johnny's birthday," without divulging any personal information regarding who Johnny is. Other children could relate to this, as well as Johnny if he was in the store. Also, the robot might display a message indicating that it is Johnny's birthday and that the robot is currently e-mailing Johnny to wish him a good birthday. The e-mail might indeed come from a central controller with which the robot is communicating. The actual exchange of information between the robot and the central controller could be limited so as to limit bandwidth required.

As described above with reference to FIG. 6, the robot system 10 includes an LED Mouth 762. Thus, the mouth 762 may utilize LED technology. However, it should be appreciated that the mouth 762 may utilize other types of known light sources, such as light bulbs. The mouth 762 may be formed from a series of lights which collectively form the shape of a mouth. Further, each light forming the mouth, in accordance with one embodiment, may be independently movable, for example, as controlled by the processor portion 100. Further, the on-off status of each light may also be independently controlled by the processor portion 100. This allows the processor portion 100 to create a wide variety of expressions for the robot system 10 by moving the various lights as desired. For example, when generating a smile on the robot system 10, the outer lights may be physically raised, while the central or inner lights are lowered, thus forming a smile expression. It should further be appreciated that the manipulation of the lights forming the mouth 762 may be utilized in conjunction with other processes performed by the robot system 10. For example, upon the robot system 10 announcing a new sale, the robot system 10 smiles. Alternatively, if a customer asks if a sale is "still on," the robot might frown when announcing that the queried sale is actually over.

The robot system 10 may communicate with the Internet, and Ethernet, other network systems, or other processing systems, utilizing wireless technology. For example, the robot system 10 may use streaming video technology.

In accordance with one embodiment of the robot system 10, the body portion 11, as described above, is an outer shell. The outer shell may be formed in any of a wide variety of shapes depending on the particular retail environment in which the robot system is to be used. Also, the outer shell may include any of a variety of physical features including arms, simulated feet, accessible compartments for holding items, platforms for holding items such as a customer's purse used while the robot system 10 is assisting a customer, or leaning surfaces. The leaning surface may be disposed in front of a monitor, for example. Such an arrangement allows persons, including adults and children, to lean on the leaning surface when viewing the monitor or otherwise interacting with the robot system 10. The leaning surface may be a horizontal surface or an angled surface, and may include one or multiple separate surfaces. Further, in accordance with one embodiment, the processor portion 100 controls the position, for example, the height of the leaning surface. Accordingly, once the processor portion determines the height of the customer with which the robot system 10 is interacting, the robot system 10 may then adjust the height of the platform.

Further, the robot system 10 may include a head of a wide variety of designs depending on the particular use and retail environment in which the robot system 10 operates. In addition to the mouth 722 described above, the robot system 10 may also include other mechanical, electromechanical, or electrical components which are controlled by the processor portion 100. for example, the robot system 10 may include movable ears. The movable ears may rotate, translate in a vertical or horizontal direction, extend in or out, or otherwise move. Such manipulation of the ears, as well as the other features, are controlled by the processor portion 100, or another suitable processing portion.

The robot system 10 provides product information to customers. Accordingly, in accordance with one embodiment, the robot system 10 possesses inventory data. Such inventory data, as well as other data utilized by the robot system 10, may be input using either a physical connection or a wireless connection. The particular connection utilized may depend on conditions in a particular retail environment and cost considerations, for example. For example, the robot system 10 may input the data from a physical connection with a docking station. This input of data may occur simultaneously with recharging the battery of the robot system 10 as well as performing other replenishment operations.

The robot system may also utilize voice recognition techniques in operations of the robot system 10. The voice recognition techniques may identify a particular person, or alternatively, may identify the age of the person with which the robot system 10 is interfacing. Such voice recognition allows the robot system 10 to more effectively interact with the person. For example, the robot system 10 may interact with an adult using different expressions than those used with a child.

Further, various operations performed by the robot system 10 may be used in conjunction with each other. For example, voice recognition identification of a customer's age may be used in conjunction with a height determination performed by the sensors of the robot system 10. These two respective inputs may then be utilized to assess the qualities of the person. Once such an assessment is performed, the processor portion 100 may then use the information to control other operations, such as appropriate manipulation of the mouth 762, as described above.

As described above, a Kalman filter portion 440 may be utilized in the motion sub-system portion 400. For example, an off-the-shelf Kalman filter may be utilized in accordance with one embodiment of the system and method of the invention. The Kalman filter takes input and then processes that input to generate navigation information. Various sensor inputs may be utilized including sonar information, odometry information, and gyroscope information. The Kalman filter may be utilized to assess the accuracy of the various inputs.

Further, an encoder device 748 may be utilized in the support system portion 740 as described above. The encoder device may be utilized to control operation of the drive wheels, for example. Illustratively, the processing portion or control portion of the robot system 10 may command the motors to turn the robot system 10 at a certain rate or, alternatively, to travel 4 feet. However, the motors don't know exactly what 4 feet is and, as a result, the motors receive feedback from an encoder mechanism, i.e., a disk or optical reader, to provide feedback information. A portion of the encoder mechanism is disposed on and spinning with the wheels. For example, there may be slots utilized in the encoder and the control system knows that there are, for example, 1000 slots, and 4000 slots are necessary to travel a distance of 4 feet. For example, an optical encoder may be positioned on the drive shaft of the motor, or alternatively on a wheel, keeping track of wheel rotation. It should further be appreciated that it is not required that the encoder actually be disposed on the driven wheel. For example, the encoder device could be disposed on a free rolling trailing wheel, for example. The rotation of the trailing wheel would provide the necessary feedback to a motor control mechanism to monitor the driven wheel, i.e., the travel of the robot system, as is necessary or desired.

In accordance with one embodiment of the system and method of the invention, a server arrangement may be utilized. For example, servo motors may be utilized that provide for "closed feedback" systems. Accordingly, an on-board computer may tell the wheels to turn an X amount of rate. The optical encoders verify that the robot system 10 has indeed traveled the requested 2 feet and sends that information back to the computer. As a result, the computer terminates the command sent to the motor commanding travel. Accordingly, a servo-control may be characterized as an exact system. That is, a command is given to perform a particular action, verification of performance of that action is generated and received by the controlling system, after which the controlling system terminates the operation. It should be appreciated that servo-loop arrangements may be utilized with the various devices on the robot system 10 including the wheels, arms, or head, for example, or any other mechanical or electro-mechanical device, the motion of which must be controlled.

Figure 23:
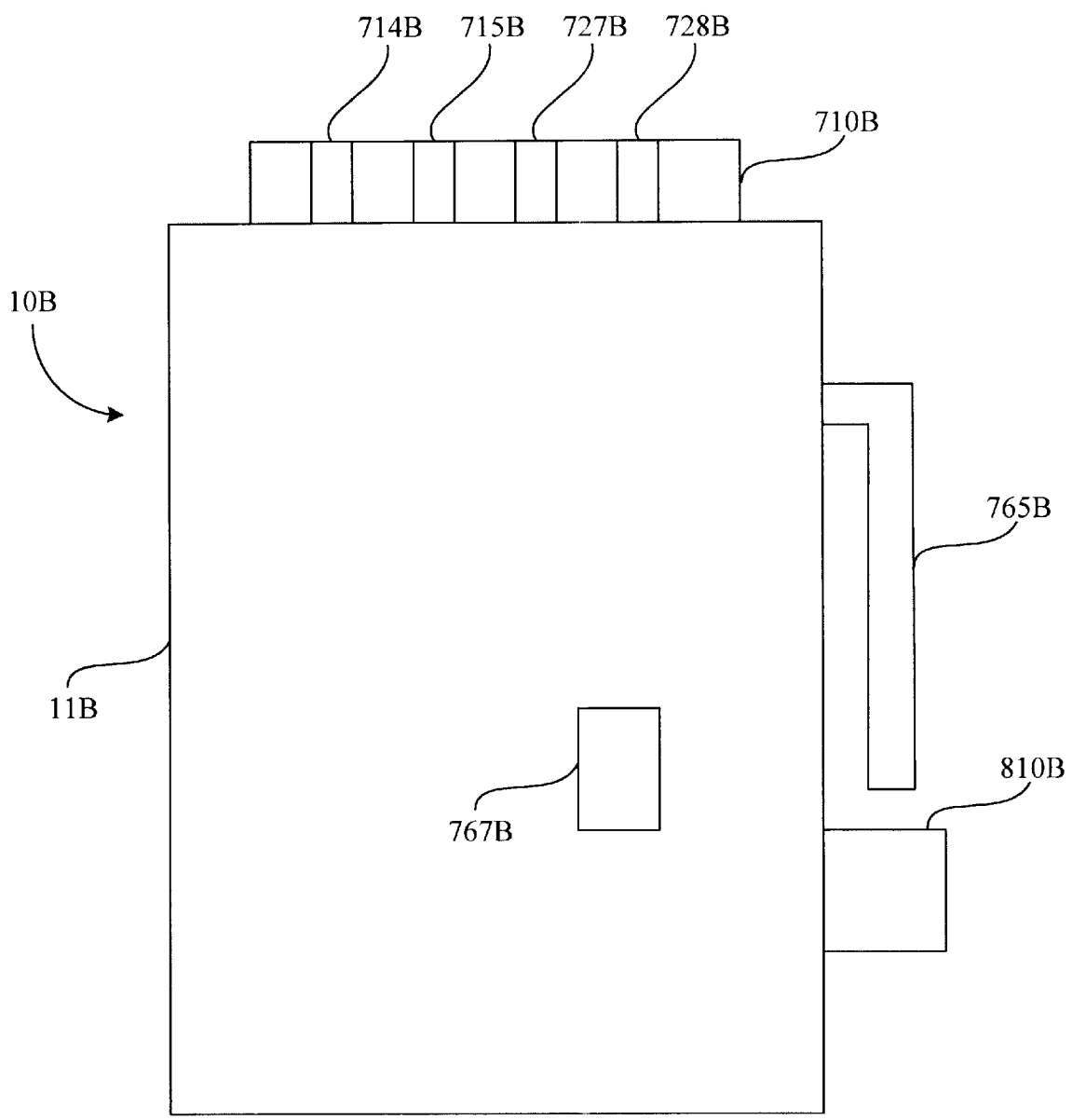
FIG. 23 is a schematic of a robot for use in a retail environment in accordance with one embodiment of the invention.

FIG. 23 is a schematic of a robot for use in a retail environment in accordance with one embodiment of the invention. As shown in FIG. 23, holding container 810B is attached to body portion 11B of robot 10B. Armature portion 727B may remove items from holding container 810B and present the items to a customer in the retail environment. Included in environment interface portion 710B (sensor system), and mounted on body portion 11B of robot 10GB, are gaseous sensor 714B, heat sensor 715B, audio sensor 727B, visual sensor 728B, and a card reader 767B is disposed on the body portion 11B.

Figure 24:
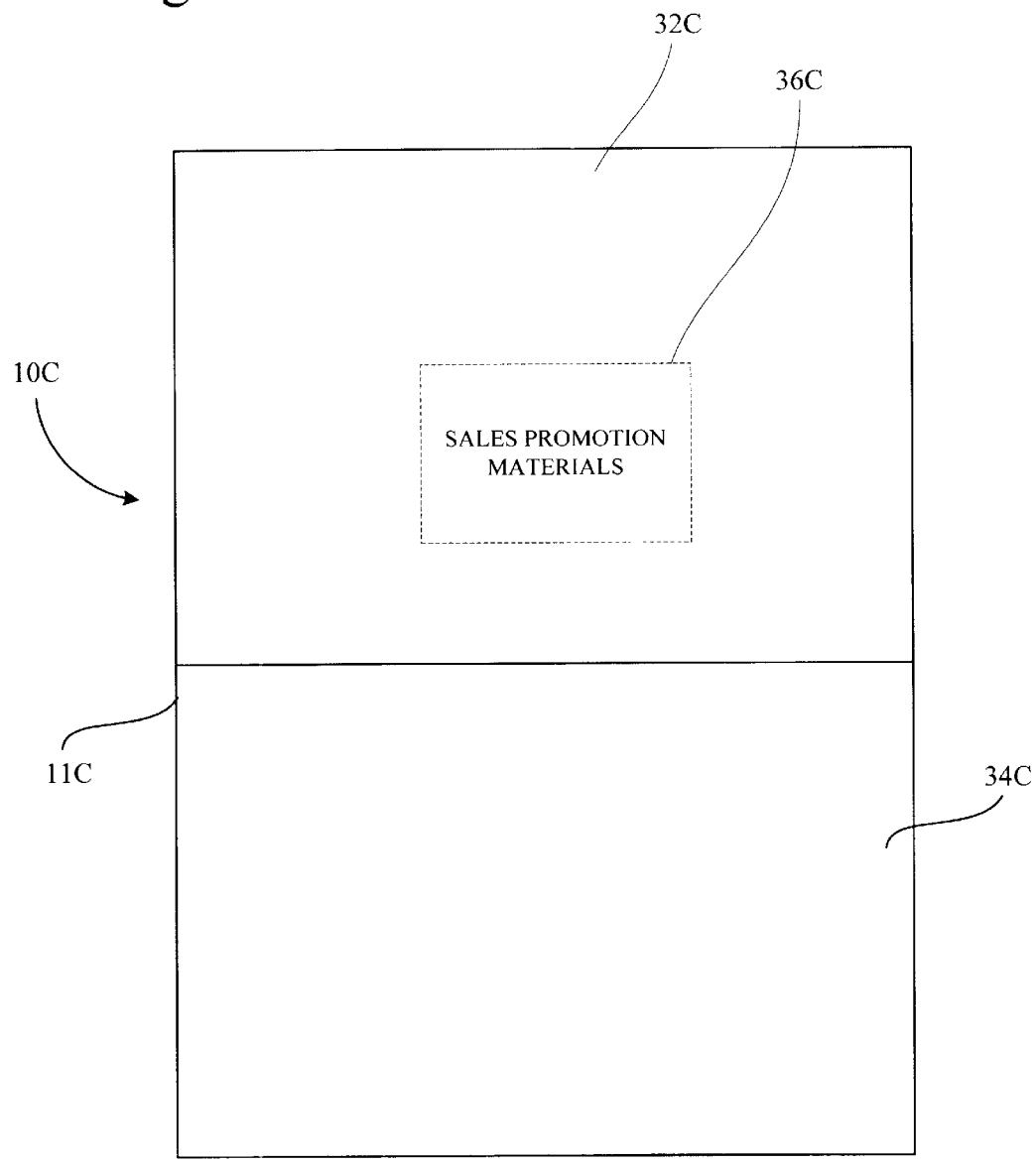
FIG. 24 is a schematic of a robot for use in a retail environment in accordance with one embodiment of the invention.

FIG. 24 is a schematic of a robot for use in a retail environment in accordance with one embodiment of the invention. As shown in FIG. 24, body portion 11C of robot 10C includes base portion 34C and upper portion 32C disposed upon the base portion 34C. Sales promotion materials 36 are displayed on body portion 11C.

Figure 25A:
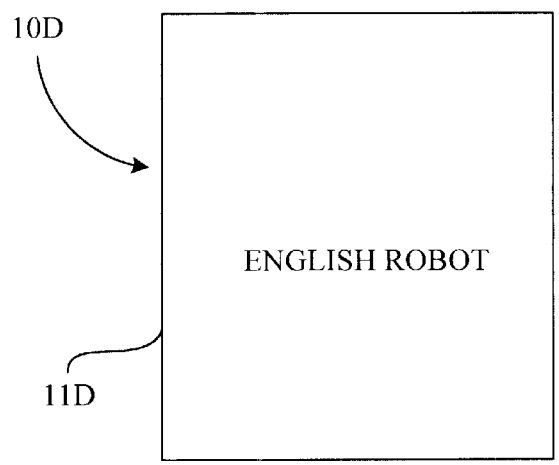
FIGS. 25A–25C are schematics of robots for use in a retail environment in accordance with further embodiments of the invention.
Figure 25B:
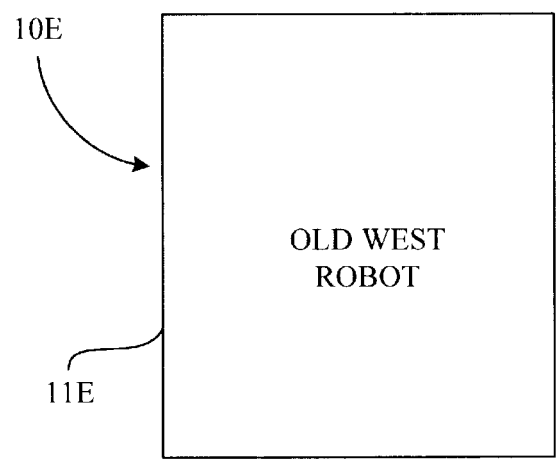
Figure 25C:
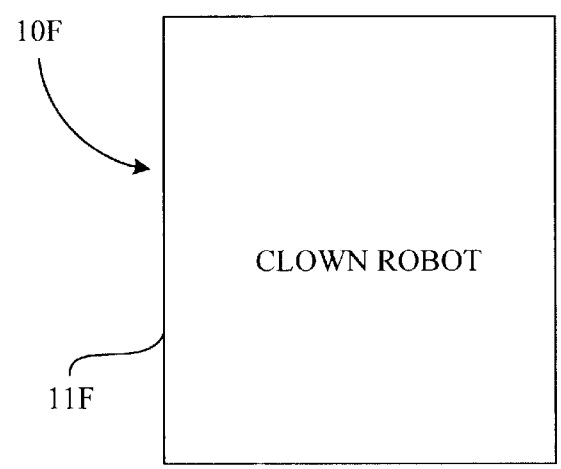

FIGS. 25A–25C are schematics of robots for use in a retail environment in accordance with further embodiments of the invention. FIG. 25A shows robot 10D, wherein body portion 11 D represents the persona of an English robot. FIG. 25B shows robot 10E, wherein body portion 11E represents the persona of an Old West robot. FIG. 25C shows robot 10F, wherein body portion 11F represents the persona of a Clown robot. In accordance with one embodiment of the system and method of the invention, a filtering process may be utilized to effectively use data output by the gyroscope. For example, if a controller portion commands the robot to go straight and the wheels are experiencing slippage, the gyroscope will accurately inform the controller of rotation of the robot system 10. Accordingly, the gyroscope provides angular sensing and input, which is particularly useful when turning the robot.

It should be appreciated that the robot system 10 may be utilized for a variety of operations including providing services to customers during the day and cleaning at night, performing security operations, and stocking shelves, as well as other tasks for example. A suitable scheduling process or technique, as illustratively described above, may be utilized in controlling these various operations. Further, it should be appreciated that a variety of detachable devices or units, for example, may be utilized on the robot system 10. Accordingly, such detachable devices may be exchanged depending on the current operation of the robot system 10.

As described herein, it should be appreciated that the robot system 10 may utilize a docking system. A "home position" is provided at which the robot docks in the "docking position." When positioned in a docking position, the robot system 10 is electrically connected to a recharging source, for example. Accordingly, the robot system 10 may go out onto a floor of the retail environment and work for a number of hours at which time the robot navigates its way back to the home position. At the home position, the robot system 10 self-docks itself so as to provide for replenishment. With respect to recharging the batteries, the recharging may, for example, be performed utilizing an inductive-type pickup wherein a plate is positioned in the floor; and the robot system 10 is positioned over that plate so as to provide for charging utilizing inductive techniques. Of course, a variety of other items may be replenished on the robot system 10 including water, candy, coupons, printing paper, promotional flyers, as well as other exhaustible items.

In accordance with one embodiment of the method and system of the invention, a touch shield or lower shield may be provided. The touch shield provides feedback to the robot such that, if the robot bumps into something, or if something bumps into the robot, the robot can determine which quadrant the impact came from. For example, the impact may have come from the left, right, rear or front, for example. The touch shield is a physical element that surrounds a lower portion of the robot. The touch shield may be connected to the robot body using movement sensitive linkages, for example.

In accordance with one further embodiment of the method and system of the invention, the robot system may use a variety of boards. For example, all the closed-loop processing may be done using a drive amplifier board. There may be two components utilized: an amplifier board that applies the power to the motors; and a drive CPU board that actually takes care of all of the "when-you-get-there" operations. Accordingly, there are two boards working in concert in accordance with one embodiment of the method and system of the invention.

In accordance with further embodiments, the method and system of the invention provide a variety of processes to facilitate a retail environment. That is, a method of utilizing a remote autonomous retail robot to facilitate a retail environment is provided comprising the steps of first placing the robot in a retail environment. After the robot has been placed within the retail environment, the robot is commanded to perform a retail function. Once the robot receives the command to perform a retail function, the robot facilitates, i.e., operates within and enhances, the retail environment. An illustrative method of utilizing a remote autonomous retail robot to facilitate a retail environment is shown in FIGS. 11–17, and described below.

FIG. 11 is a flowchart showing a method of utilizing a retail robot to facilitate a retail environment in accordance with an embodiment of the method and system of the invention. The process begins in step S50, and then passes to step S100, wherein the robot is placed within the retail environment. Then, after the robot has been placed within the retail environment, in step S200, the robot is commanded to perform a retail function in step S200. Once the robot receives the command to perform a retail function, the robot facilitates the retail environment in step S300. The process then passes to step S400, where it ends. The process may be further understood by examining FIGS. 12–17, which show the method of FIG. 11 in further detail.

Figure 12:
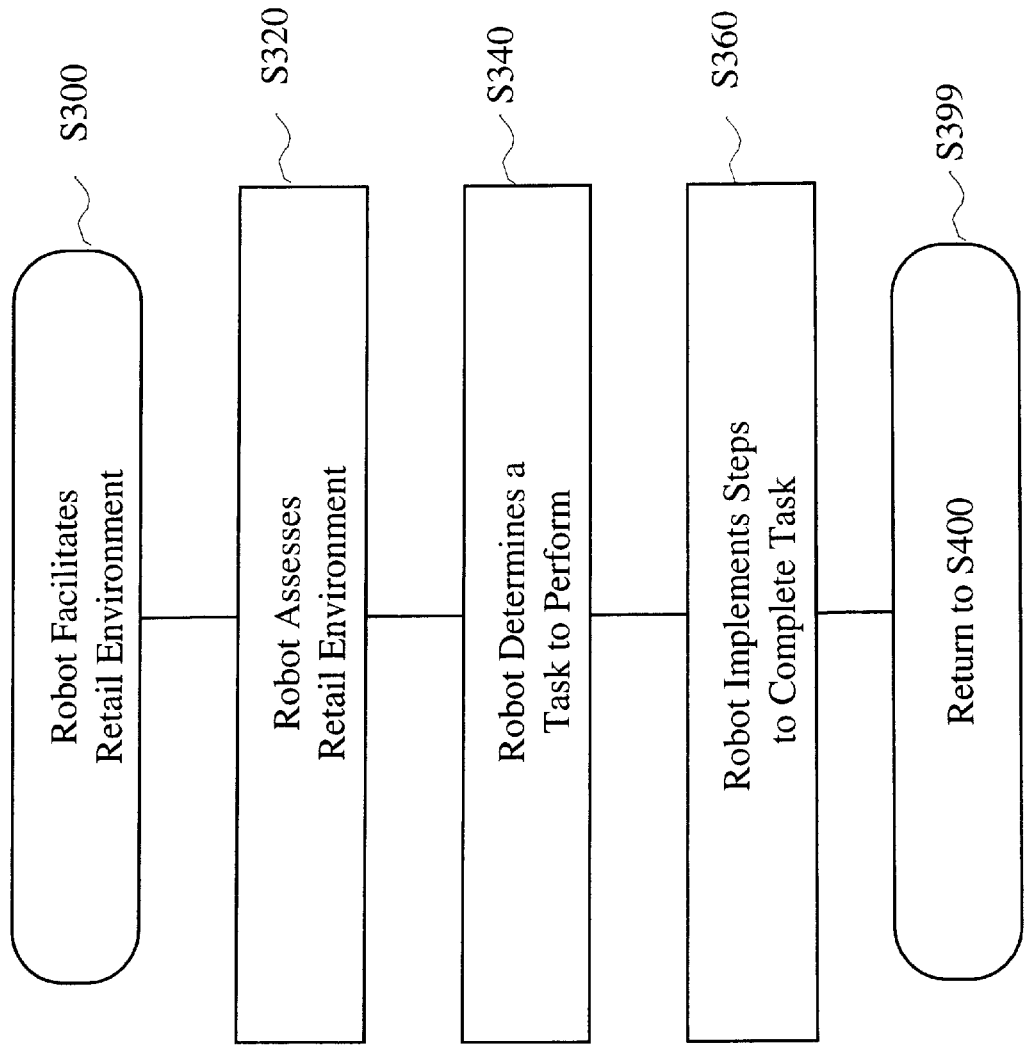
FIG. 12 is a flowchart showing the "robot facilitates retail environment" step of FIG. 11 in further detail in accordance with an embodiment of the method and system of the invention.

FIG. 12 is a flowchart showing the "Robot Facilitates Retail Environment" step of FIG. 11 in further detail in accordance with an embodiment of the method and system of the invention. The process begins in step S300, and then passes to step S320. In step S320, the robot assesses the retail environment it has been placed within. After the robot has assessed the retail environment, in step S340, the robot determines a task to perform. Once the robot has determined a task to perform, in step 360, the robot implements the steps to complete that particular task. The process then passes to step S399, where the process returns to step S400.

It should be appreciated that the process whereby the robot determines a task to perform may repeat as many times as necessary to complete a list of scheduled tasks. For example, the robot may perform a given task, and return to assess its list of given tasks seeking its next highest priority task. During any period of time that the robot is performing a task, the robot may receive a command to perform a more important task. Accordingly, when this occurs, the robot must perform the more important task and remember the current state of the unfinished task so that the robot can revisit the unfinished task later. Consequently, it should be appreciated that the robot may go through several iterations of performing tasks, all the while monitoring the retail environment for more tasks to add to its lists of things to do.

As stated above, the robot is continuously monitoring the retail environment for tasks that must be addressed. These tasks may also be initiated using "triggers," in accordance with a further embodiment of the methods and systems of the invention. One of the skill in the art will appreciate that this may be accomplished by directing the robot to check for new triggers based on a schedule. As such, the robot's functional routine would be divided into time slices, much the same way a computer operates, in which the robot would be commanded to check for new triggers based on a predetermined interval of time slices. Illustratively, the robot may be commanded to check for spills, while navigating through the retail environment every four time intervals. Although there is an actual break of time in between the checks, while the robot performs other functions, to a human observer it would appear that the robot is continuously monitoring for spills.

Figure 13:
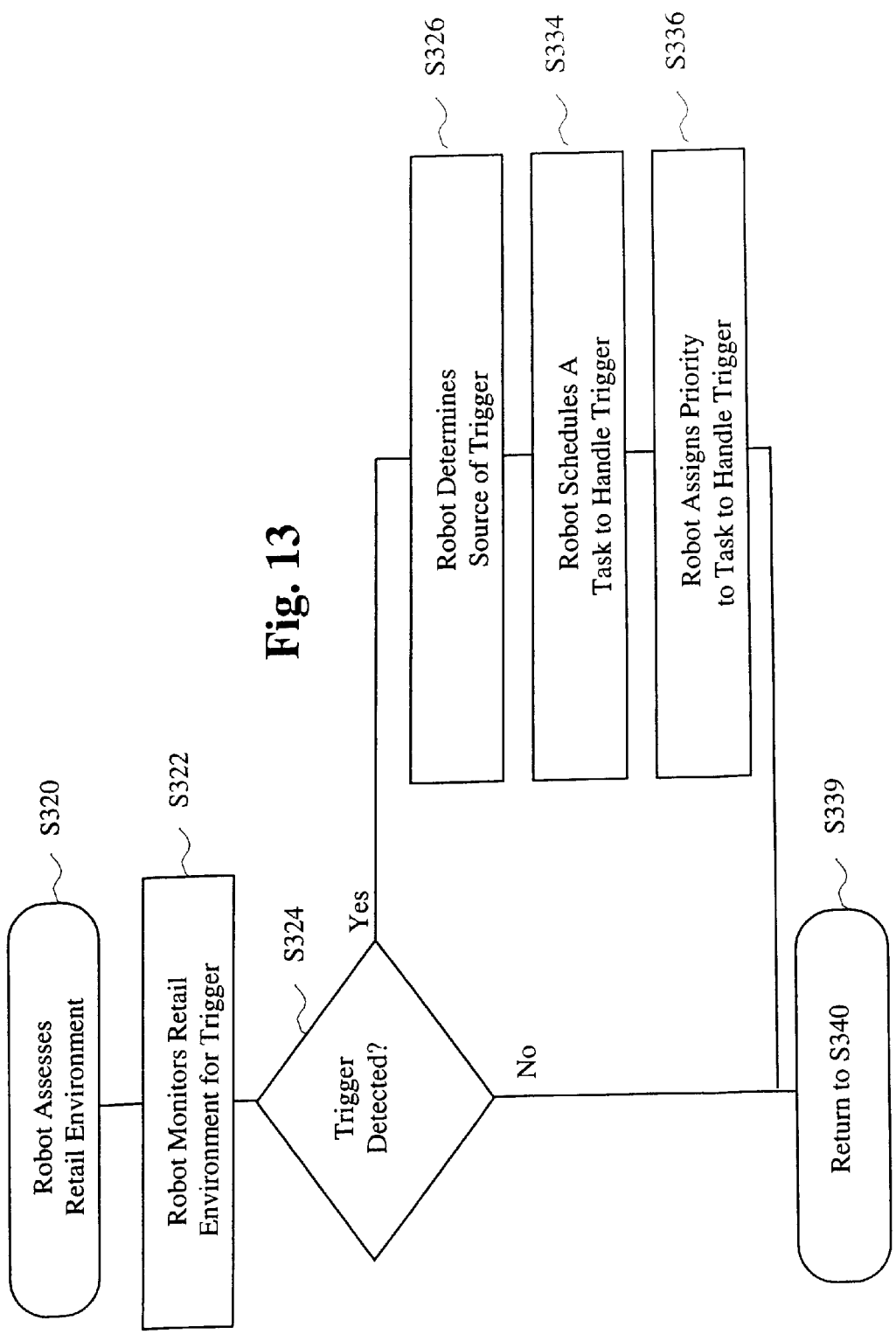
FIG. 13 is a flowchart showing the "robot assesses retail environment" step of FIG. 12 in further detail in accordance with an embodiment of the method and system of the invention.

The robot's assessment of the retail environment may be further understood by examining FIG. 13, which is a flowchart showing the "Robot Assesses Retail Environment" step of FIG. 12 in further detail in accordance with an embodiment of the method and system of the invention. The process begins in step S320, and then passes to step S322 in which the robot monitors the retail environment for triggers. A trigger is an input to the robot or retail system that causes a new task to be scheduled in accordance with one embodiment of the methods and systems of the invention. However, it should be appreciated that the robot may be commanded to ignore certain triggers, based on the current operating circumstances and the operating programming of the robot system.

In step S324, the robot determines whether or not a trigger was detected. If a trigger was detected, the process passes to step S326, where the robot determines the source of the trigger. Once the source of the trigger is identified, the robot schedules a task to respond or handle the trigger in step S334. With a task scheduled to handle the trigger, in step S336, the robot assigns a priority to the task that will handle the trigger. Then, the process passes to step S339, where it returns to step S340.

It should be appreciated that a trigger is an input that comes from either the retail environment, an internal data source, or an external data source, in accordance with one embodiment of the methods and systems of the invention. For example, triggers in the retail environment may include a customer asking the retail robot a question, the detection of a customer while the robot is tasked to perform an advertising or marketing function, the detection of smoke or fire while navigating the retail environment, and any other circumstance where the robot might detect an occurrence or situation that it is programmed to handle. Once the robot receives a trigger, a task is scheduled to manage the trigger.

For example, if the robot detected smoke, the trigger manager portion would determine that the robot must alert the central system and the management of the retail environment. Based on the tasking the robot is programmed to perform, the robot may also alert the fire department and other emergency personnel in such a situation. How the robot reacts to a given trigger is determined in the robot's programming or trigger maps. These trigger maps define what the robot should do based on the triggers, or inputs, received by the robot. In addition, it should be appreciated that a task may be performed based on a script. A script is a list of a limited set of commands that if followed, will complete a scheduled task.

Alternatively, if in step S324, the robot determines that no trigger was detected in step S322, the process passes directly to step S339. Again, in step S339, the process returns to step S340, where the robot determines a task to perform.

Figure 14:
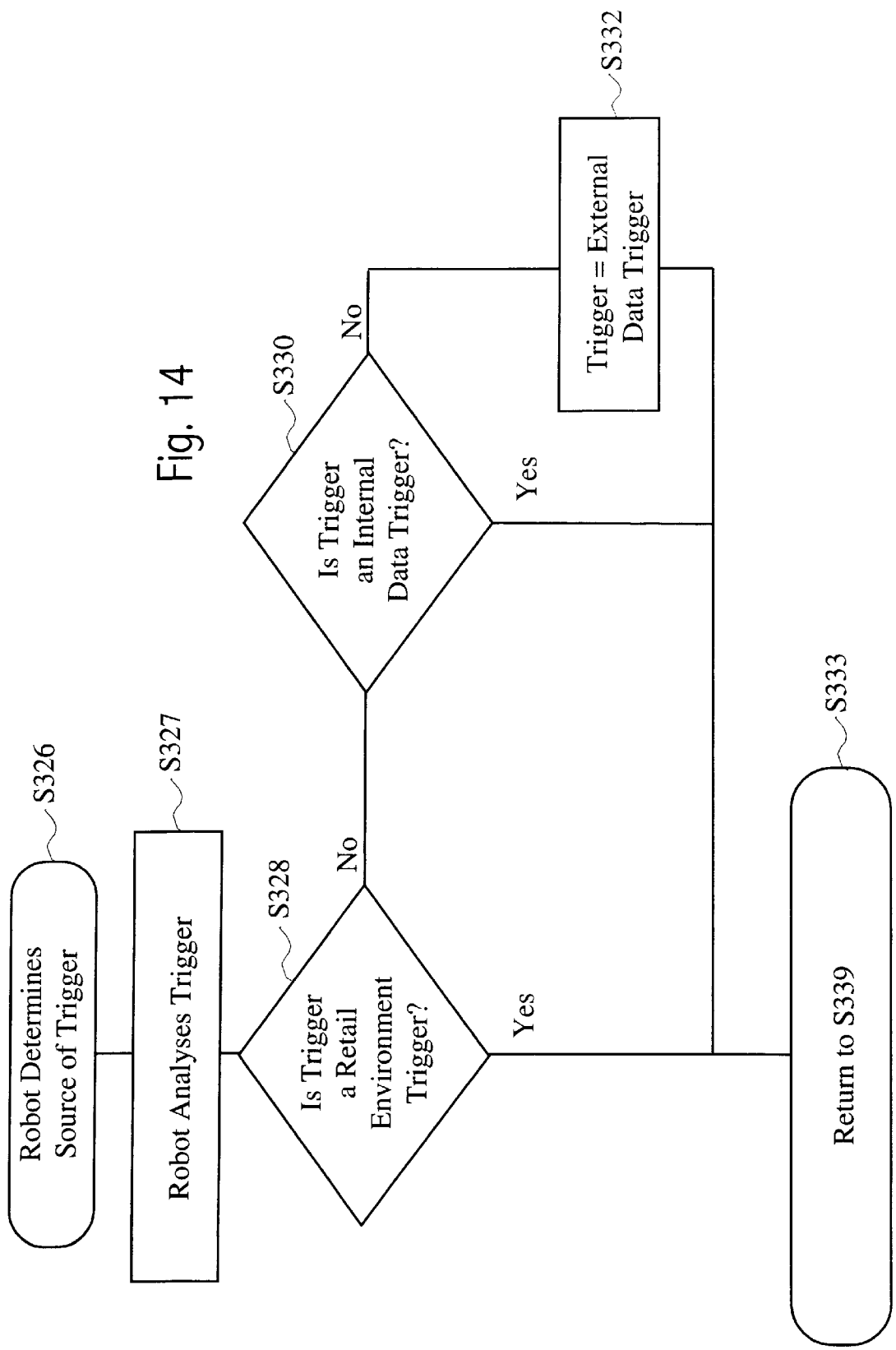
FIG. 14 is a flowchart showing the "robot determines source of trigger" step of FIG. 13 in further detail in accordance with an embodiment of the method and system of the invention.

To further understand how the robot determines the source of trigger detected in its analysis of the retail environment, FIG. 14 is provided. FIG. 14 is a flowchart showing the "Robot Determines Source Of Trigger" step of FIG. 13 in further detail in accordance with an embodiment of the method and system of the invention. The process begins in step S326, and then passes to step S327. Then, in step S327, the robot analyzes the detected trigger. Following the analysis of the trigger, the robot determines whether the trigger is from the retail environment, in step S328. If the trigger was from the retail environment, the process passes to step S333, where the process returns to step S334.

Alternatively, if the robot determines that the trigger was not from the retail environment, the robot determines whether or not the trigger is from an internal data source, in step S330. If the trigger was from an internal data source, the process passes to step S333. If the robot determines the trigger was not from an internal data source in step S330, the process passes to step S332. Then, in step S332, the process identifies the trigger as from an external data source. Following step S332, the process passes to step S333. Again, in step S333, the process returns to step S334, where the robot schedules a task to handle the trigger.

As stated above the various triggers may come from the retail environment, an internal data source, or an external data source. As stated above, retail environment triggers include any circumstance, situation or occurrence in the retail environment that the robot must address once detected. Illustratively, examples include a customer asking a question, the robot's detection of a customer that might participate in a marketing test, or a broken food container in an isle of a store. The types of triggers the robot will be capable of handling will depend on the robots programming, tasking and commanded function. However, if the robot is commanded to perform an advertising function in the retail environment on a given day, and during the course of performing the advertising tasks the robot detects an emergency situation, it will break from the advertising function to deal with the emergency. Thus, if the robot is interacting with a customer and advertising a new product, and while doing so the robot detects smoke, the robot will break from the interaction and alert management and emergency personnel of the smoke detection. Therefore, one should appreciate that within the robot or retail system the various triggers and corresponding tasks must be placed within a predetermined hierarchy such that the robot will recognize how to prioritize the tasks it must complete.

Furthermore, triggers originating from internal and external data sources may include electronic communications with the robot or retail system. For example, external data triggers may include commands from a central system via any suitable communication interface, modem, telephone, fax, or other computer connection, the receipt of data input from an IP address given to the robot, or any other suitable connection through which the robot's processor might receive input from an external source. In addition, an example of an external data trigger may include a retail robot receiving a command from another robot to perform a task. As such, if a fleet of robots were deployed in a retail environment, and one robot detected a trigger that it could not address at that time, the robot could send a command to another robot, through any suitable interface, to perform the necessary task. Accordingly, an illustrative fleet of robots may take commands from a manager robot dispatching commands and tasks through interfaces with the other robots facilitating the retail environment.

Internal data triggers would be those originating from the robot itself and that require the robot to perform a necessary task. For example, if the robot requires recharging of its batteries, or its diagnostic testing reveals that it requires mechanical repair, the robot may schedule a task to handle the above situation. Accordingly, the robot may be responsible for monitoring its own readiness in the retail environment, and can alert the control system to conditions that require it to be serviced. For simple tasks like recharging the robot's batteries, the robot may simply go to a station whereby it can recharge itself. The ability of the robot to service itself allows the robot to increase its ability to operate for continuous periods of time in the retail environment without human maintenance.

Figure 15:
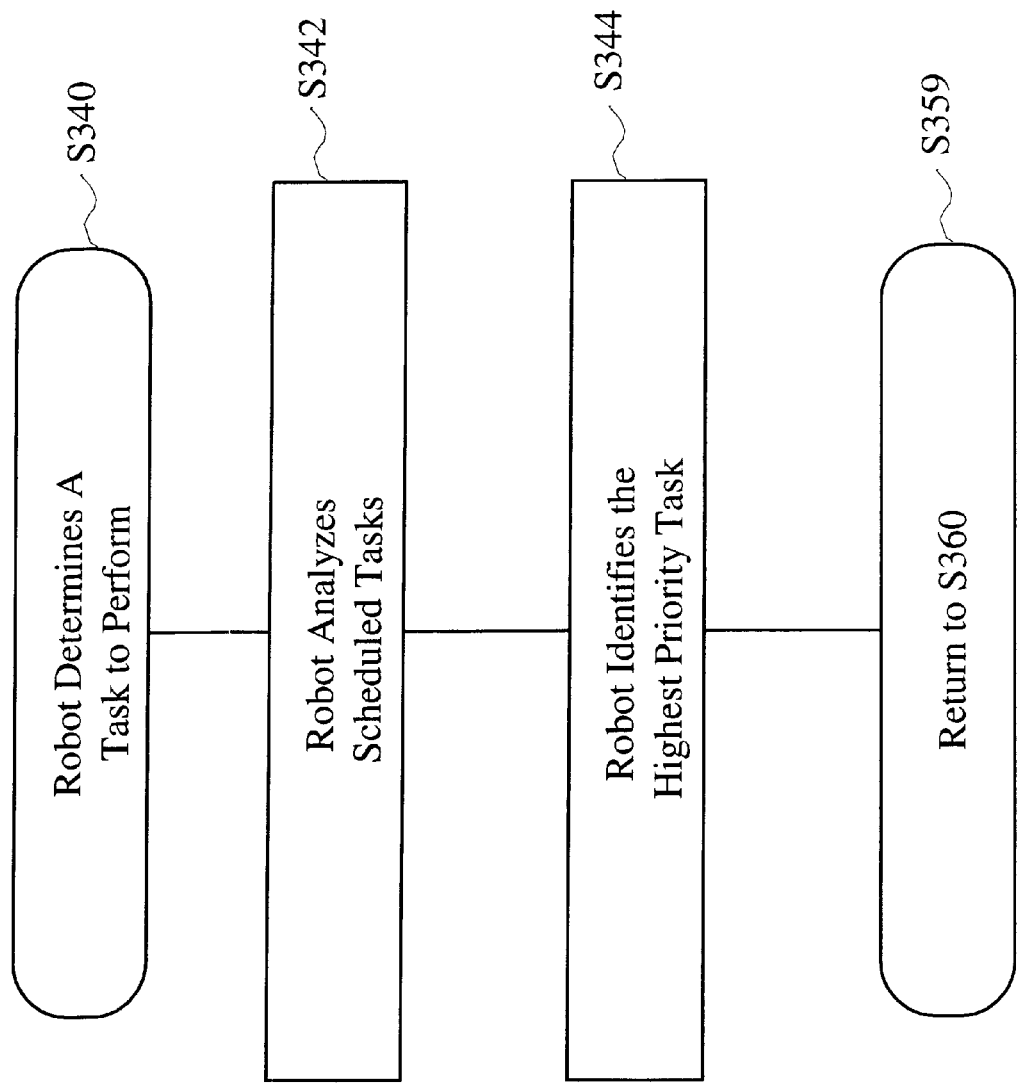
FIG. 15 is a flowchart showing the "robot determines a task to perform" step of FIG. 12 in further detail in accordance with an embodiment of the method and system of the invention.

FIG. 15 is a flowchart showing the "Robot Determines A Task To Perform" step of FIG. 12 in further detail in accordance with an embodiment of the method and system of the invention. The process begins in step S340, and then passes to step S342. In step S342, the robot analyzes its scheduled tasks. Then, in step S344, the robot identifies the highest priority task scheduled. Once the highest priority scheduled task is identified, the process passes to step S359, where it returns to step S360.

It should be appreciated that in accordance with the method and system of the invention, the robot may store a list of scheduled tasks in any suitable fashion. Such a list of scheduled tasks may be stored within the robot's memory, or may be stored in a central memory system that the robot can access via a communication interface. In either case, the list of scheduled tasks may be stored as a script stack, which holds the scheduled scripts in a hierarchical fashion so that the robot can ensure that it is always performing the highest priority task. As stated above, a script is a list of commands that is used to complete a task. A script stack, stored in an accessible memory, allows the robot to assess the current highest priority task from the top of the script stack.

Figure 16:
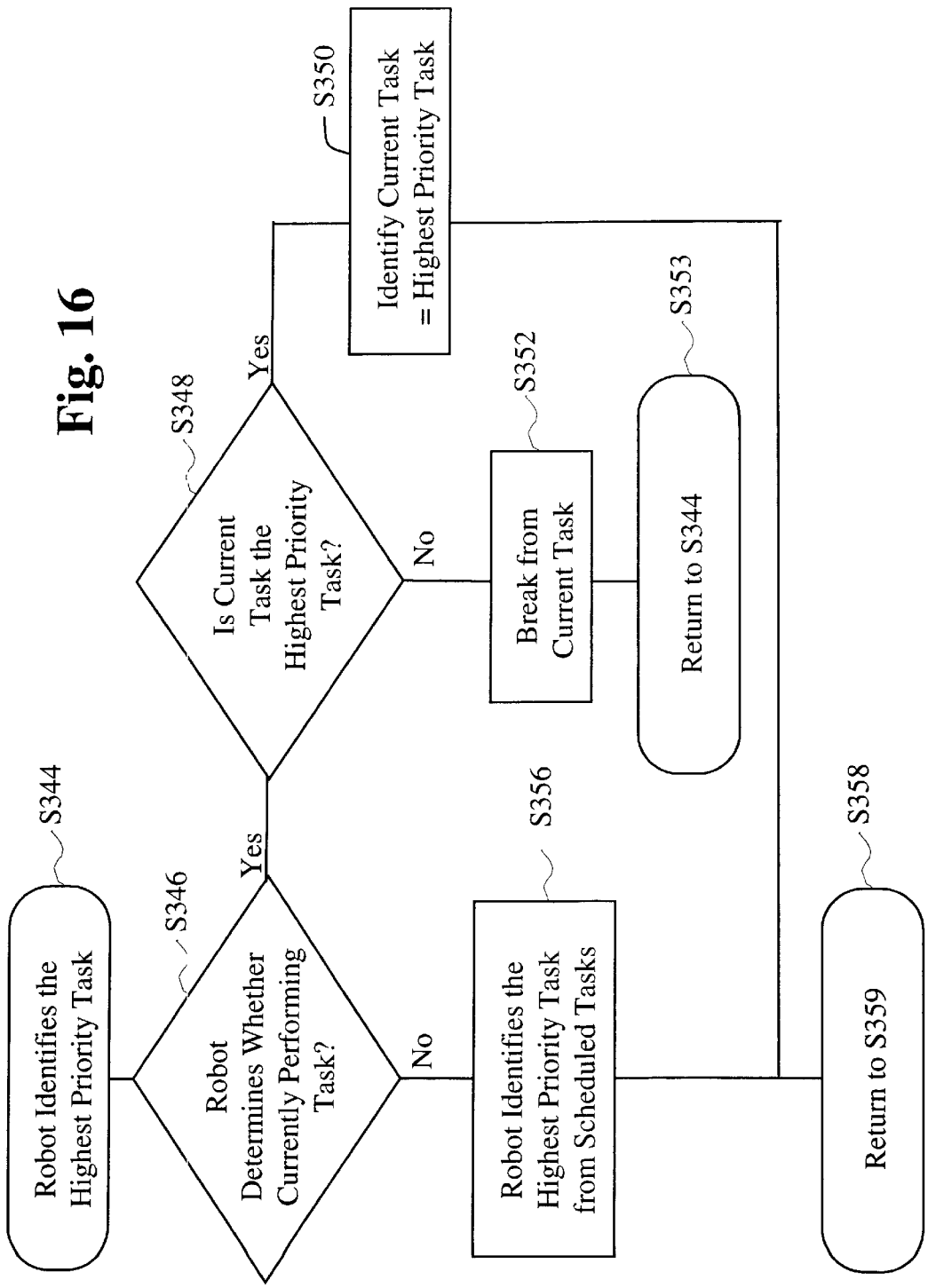
FIG. 16 is a flowchart showing the "robot identifies the highest priority task" step of FIG. 15 in further detail in accordance with an embodiment of the method and system of the invention.

FIG. 16 provides a better understanding of the robot's determination of the highest priority scheduled task. FIG. 16 is a flowchart showing the "Robot Identifies The Highest Priority Task" step of FIG. 15 in further detail in accordance with an embodiment of the method and system of the invention. The process begins in step S344, and then passes to step S346. In step S346, the robot determines whether or not it is currently performing a task. If the robot is not currently performing a task, the process passes to step S356, where the robot identifies the highest priority task from the scheduled tasks. Then, the process passes to step S358, where it returns to step S359.

Alternatively, if in step S346, the robot determines that it is currently performing a task, the process passes to step S348. Then, in step S348, the robot determines whether the current task is the highest priority task. If the current task is the highest priority task, the process identifies the current task as the highest priority task in step S350. After the current task is identified as the highest priority task, the process passes to step S358, where it returns to step S359.

If however, in step S348, the robot determines that the task the robot is currently performing is not the highest priority task, the process passes to step S352. Then, in step S352, the robot breaks from the current task, and the process passes to step S353. In step S353, the process returns to step S344, so that the robot may identify the current highest priority task.

It should be appreciated that the robot's determination of the highest priority tasks will depend on the programming, tasking and command functions provided in the robot and retail system. As such, each task that is scheduled to handle any given trigger, or those default tasks that are simply performed on a periodic basis, will each have a predetermined level of priority based on the given situation. Accordingly, a fire detection trigger may have a higher priority than a spill clean-up. Similarly, a customer's question may take priority over the stocking of shelves or delivery of an item to the storeroom. Therefore, the priority given to each circumstance must be determined by the human user utilizing the robot system to facilitate the retail environment, i.e., the person controlling the programming of the robot system.

It should further be appreciated that the robot or retail system may receive interrupt command triggers during any period in which the robot is performing a task. An "interrupt trigger" would be any trigger that presents a situation where the robot must break from the task it is performing when it receives the trigger, and complete the task to handle the interrupt trigger. For example, the robot could be advertising a certain product in the retail environment. If the manufacturer of the product currently being advertised wants to gauge the response of the customer in a certain demographic group, the manufacturer could give a command and interrupt the robot's advertising routine. Thus, the manufacturer could take over the interaction with the customer. Accordingly, the robot could be utilized to provide an interaction directly between targeted consumer groups and manufacturers. Another example of an interrupt functions may include commanding the robot to clean-up a spill in a different location in the retail environment when the robot is performing meet and greet functions at the entrance to the retail environment. Accordingly, the robot would receive a command from the retailer to move to the clean-up location.

However, the advantage of the retail robot would be that the robot can receive the command both electronically and in person with the retailer addressing the robot. Thus, it should be appreciated that while the robot is facilitating the retail environment, it is continuously monitoring for triggers, including interrupt triggers, i.e., triggers that causes the robot system to break from a task the robot system is performing, which often require immediate responses from the robot.

It should further be appreciated that in accordance with the method and system of the invention, the robot or retail system must be capable of handling situations where it was handling a task, and then the robot had to break from the task to perform a task of higher priority. Accordingly, the robot stores the steps and actions it took to complete the unfinished task, so that it may return to the unfinished task and see it through to completion. This requires that the robot store the actions already taken in completion of the task and place the unfinished task back on the list of scheduled tasks. As such, the robot returns to the unfinished task at the completion of the current highest priority task, and facilitates the retail environment by completing all of the scheduled tasks in order of priority. In addition, the robot may include a function that allows for a smooth transition between tasks under certain circumstances. For example, if a robot were interacting with a customer, and detected fire during one of the interactions, the robot may break the interaction with an apology to the customer and a statement that the robot must leave to address the emergency situation. Thus, the robot would provide a transition interaction with the customer rather than abruptly abandoning the interaction without an explanation to the customer. It should be appreciated that other transition function may be utilized to facilitate a efficient transition from task to task.

Figure 17:
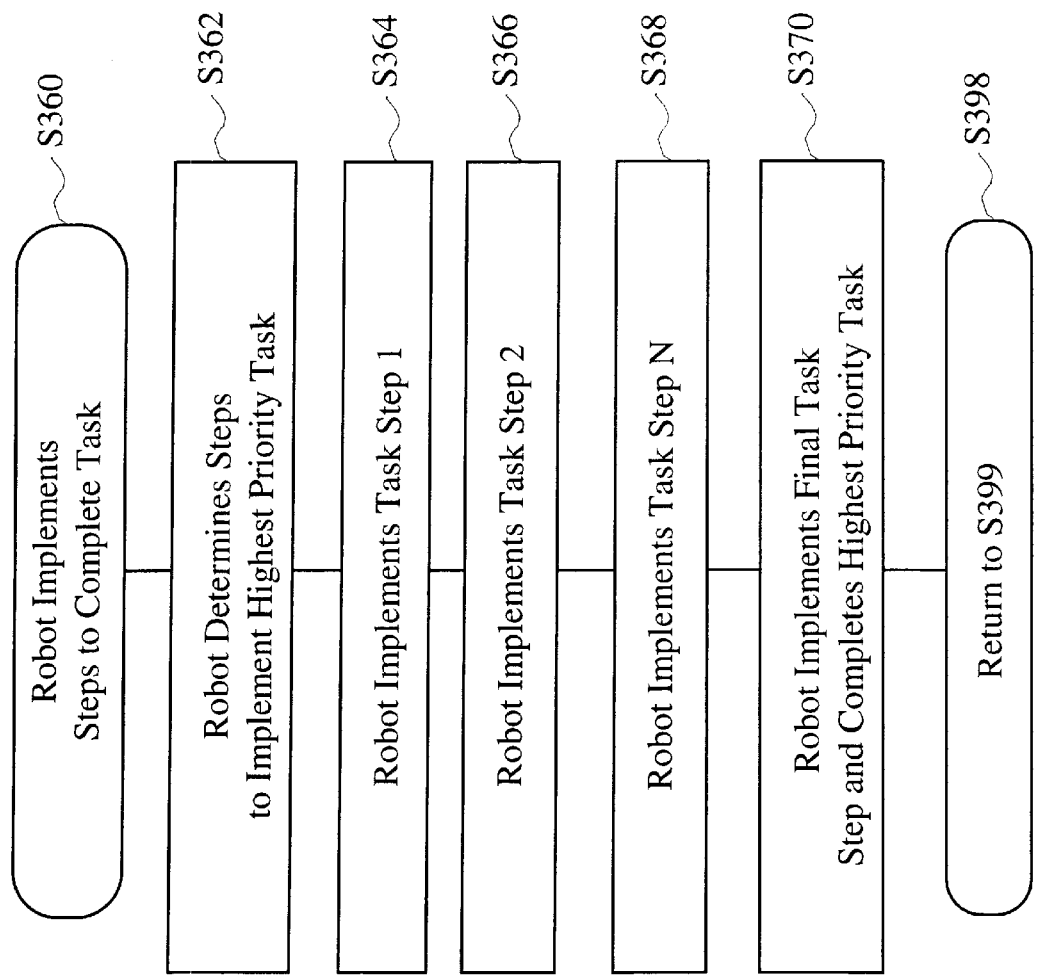
FIG. 17 is a flowchart showing the "robot implements steps to complete task" step of FIG. 12 in further detail in accordance with an embodiment of the method and system of the invention.

FIG. 17 is a flowchart showing the "Robot Implements Steps To Complete Task" step of FIG. 12 in further detail in accordance with an embodiment of the method and system of the invention. As shown in FIG. 17, the process begins in step S360, and then passes to step S362. The robot, in step S362, determines the steps that it must take to implement the highest priority task identified from the scheduled tasks. Then, in step S364, the robot implements the first step to complete the highest priority task. Then, in step S366, the robot implements the second step to complete the highest priority task. Then, in step S368, the robot implements all further necessary steps to complete the highest priority task, until the robot implements the final step to complete the highest priority task identified from the scheduled tasks in step S370. Finally, in step S398, the process returns to step S399. The process then returns to step S400, where it ends.

As stated above, it should be appreciated that the facilitation of the retail environment may be a continuously repeating process. The robot performs the steps to complete various tasks while monitoring for triggers and commands to alter its present course of action. Thus, the robot may begin the facilitation with a given list of tasks, the tasks being scheduled before the robot even enters the retail environment. Thereafter, the robot may receive several additional triggers and commands that alter the sequence of the robot's actions. The list of scheduled tasks for the robot to complete may change several times throughout the course of the period in which the robot is utilized to facilitate the retail environment. Accordingly, based on the triggers which alter how the robot functions, the robot may be utilized in the retail environment for as long as is necessary.

It should be appreciated that the retail robot system may be used to facilitate a retail environment by performing several additional retail functions and tasks. In accordance with the method and system of the invention, these functions or tasks may include performing advertising functions, marketing and analysis, customer relations and interaction, maintenance and monitoring of the retail environment, maintenance and assessment of the retail robot itself, monitoring and implementation of remotely-commanded tasks, serving as mobile kiosks, serving in a time-share advertising and marketing system for customer interaction, for example.

Figure 18A:
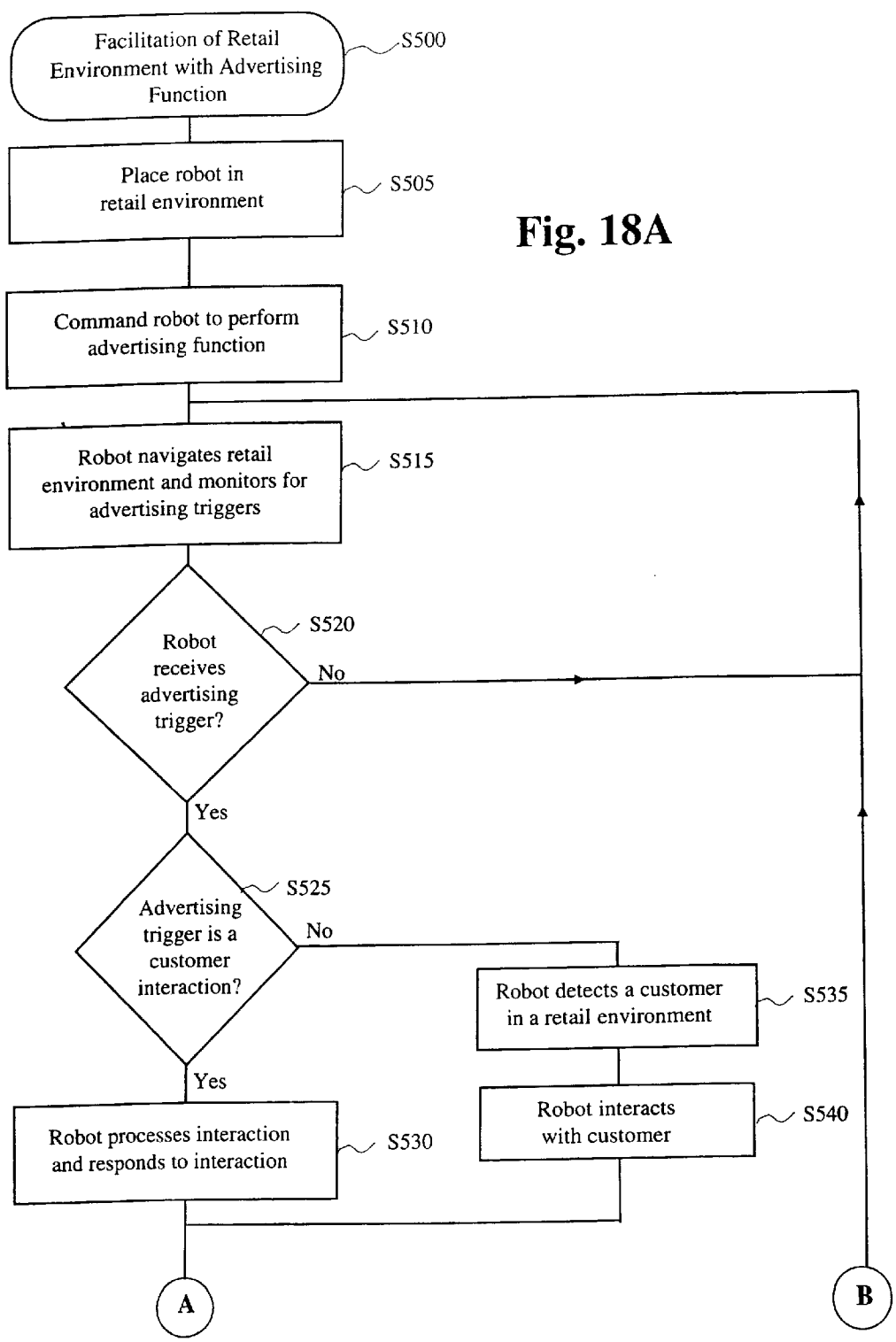
FIGS. 18A and 18B are a flowchart showing a method of utilizing a retail robot to facilitate a retail environment by performing an advertising function in accordance with an embodiment of the method and system of the invention.
Figure 18B:
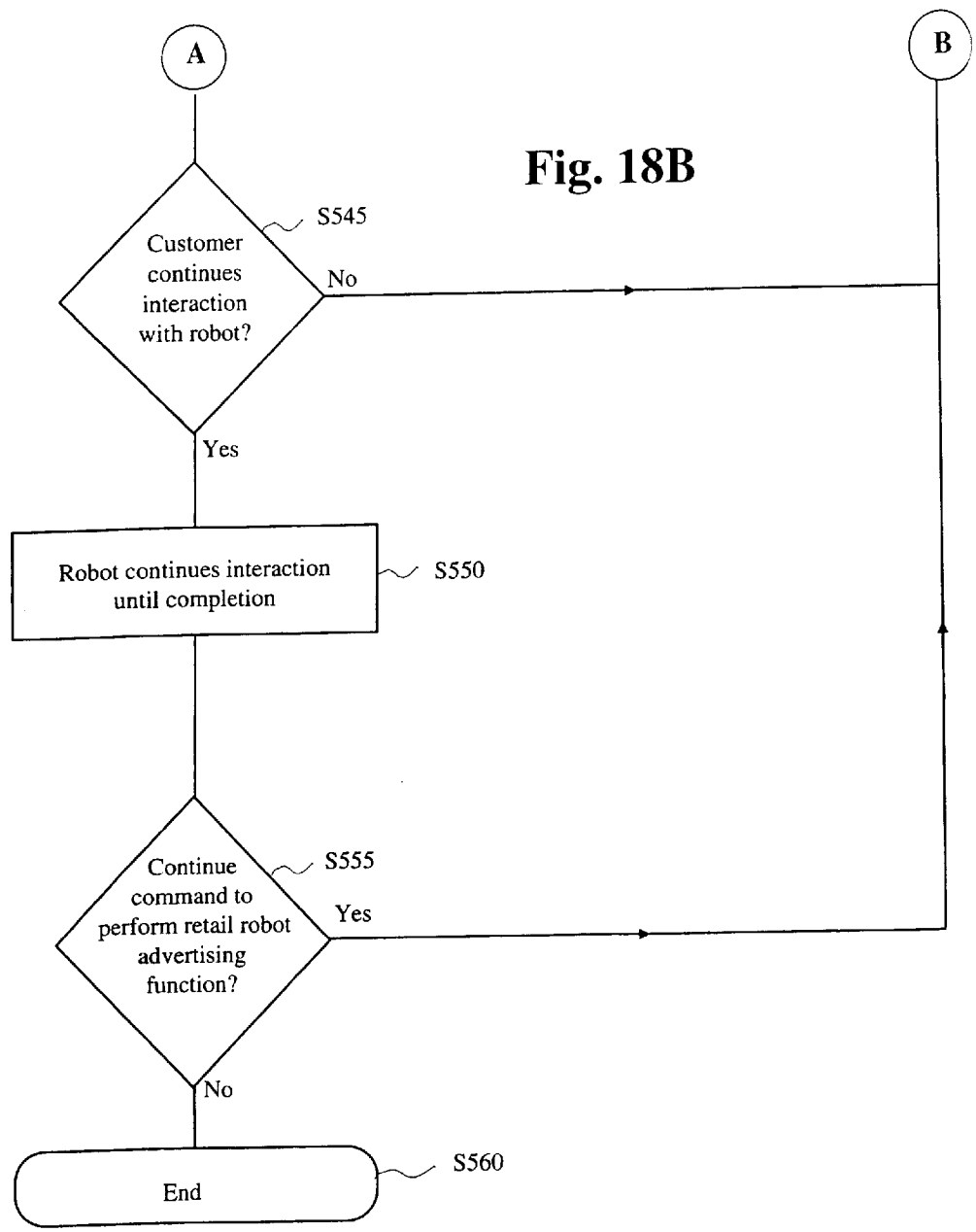

Illustratively, in one embodiment the robot is utilized to facilitate a retail environment by performing an advertising function in accordance with the method and system of the invention, as shown in FIG. 18. The process begins in step S500, and then passes to step S505. In step S505, the robot is placed within the retail environment. Then, in step S510, the robot is given the command to perform an advertising function. Along with the command to perform the advertising function, advertising information and data is input to the robot via a suitable communication interface with a central command or a remote system user. It should be appreciated, however, that the advertising information and data may be provided in the robot before it is placed within the retail environment. Likewise, the advertising data and information may be updated through any suitable communication interface with the robot while it is in the retail environment. Accordingly, a remote user or central command could send updated advertising information data and commands to the retail robot electronically and the robot would replace the then-existing advertising function with the updated data and commands.

As further shown in FIG. 18, once the robot has the appropriate advertising data and information, the robot begins to facilitate the retail environment by performing the advertising function. Accordingly, in step S515, the robot navigates the retail environment and monitors for advertising triggers. It should be appreciated that an advertising trigger is basically an opportunity for the robot to perform its advertising tasks. For example, this may include either advertising a product to a customer following an interaction, or voluntarily initiating a contact with a customer found in the retail environment to advertise a particular product.

Accordingly, while the robot is navigating through the retail environment, the system determines whether or not the robot has received an advertising trigger, in step S520. If the robot does not detect an advertising trigger, the robot returns to step S515 and continues to navigate through the retail environment monitoring for advertising triggers. However, if in step S520, the robot detects an advertising trigger, the system determines whether or not the advertising trigger is a customer interaction in step S525. If the advertising trigger is a customer interaction, the process passes to step S530, where the robot processes the customer interaction and responds to the interaction. The process then passes to step S545.

An illustrative customer interaction may include a customer approaching the robot and asking for the location or price of a particular product, or whether the retailer has the product in stock, for example. A typical robot response to a customer interaction may incorporate providing the location of the product by showing a map, printing a map, directing the customer to the actual product, or having the customer follow the robot to the product's location. However, if the robot checks the store's inventory, through wireless or wired techniques, and determines that the product is not in currently in stock, the robot could inform the customer that the store is out of the product and when the product would be restocked. For example, the robot could access the store's database utilizing wireless technology to determine if a particular product is in stock, and if not, then a possible substitute product.

Alternatively, if in step S525, the system determines that the advertising trigger is not a customer interaction, the process passes to step S535. In step S535, the advertising trigger is identified as the robot's detection of a customer in the retail environment that has not interacted with the robot. Then, in step S540, the robot attempts to interact with the detected customer. Once the robot has attempted to interact with the customer, the process passes to step S545.

For example, if the advertising trigger is the detection of a customer in the retail environment that has not initiated contact with the robot, the robot may then voluntarily interact with the detected customer. The robot would attempt to interact with the customer based on a programmed set of functions, which may include promoting products that are on sale or special, providing comparative pricing and savings information based on the customer's spending history, alerting the customer to new products coming out, or offering the customer samples of products receiving promotion, for example.

In step S545, the robot determines whether the customer in the retail environment has chosen to continue the interaction with the robot. If not, the process passes back to step S515, where the robot continues to navigate the retail environment and monitor for further advertising triggers. Alternatively, if the customer continues the interaction, the robot continues with the interaction until its completion in step S550. The process then passes to step S555, where the robot determines whether its current highest priority task is still the performance of the advertising function. If yes, the process returns to step S515, where the robot continues to navigate the retail environment and monitor for further advertising triggers. If the advertising function is no longer the robots highest priority task, the robot moves on to its next highest priority function.

Furthermore, it should be appreciated that a robot performing an advertising function may receive a response at any time from a customer due to its interaction. If this occurs, the robot responds accordingly and interacts until the customer is no longer requesting information. At this point, the robot may attempt a cross-sale of related retail products that the customer has expressed an interest in, or if the customer has identified themselves with a source of identification, the robot may be prompted to remind the customer of other products related to the customer's buying history. However, once the interaction with a customer is complete, the robot returns to the navigation of the retail environment to seek out a further customer to interact with.

Figure 19A:
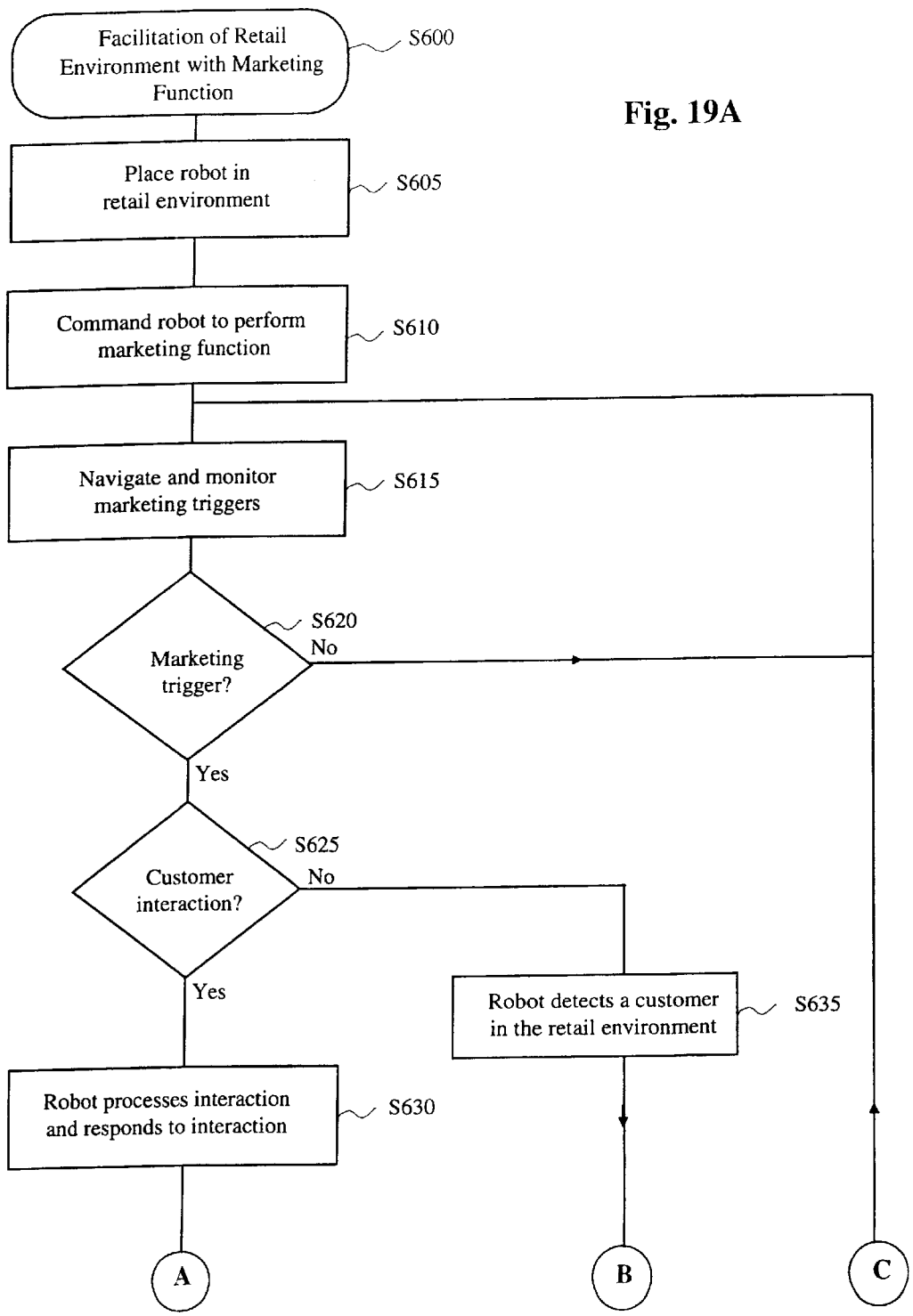
FIGS. 19A and 19B are a flowchart showing a method of utilizing a retail robot to facilitate a retail environment by performing a marketing and analysis function in accordance with an embodiment of the method and system of the invention.
Figure 19B:
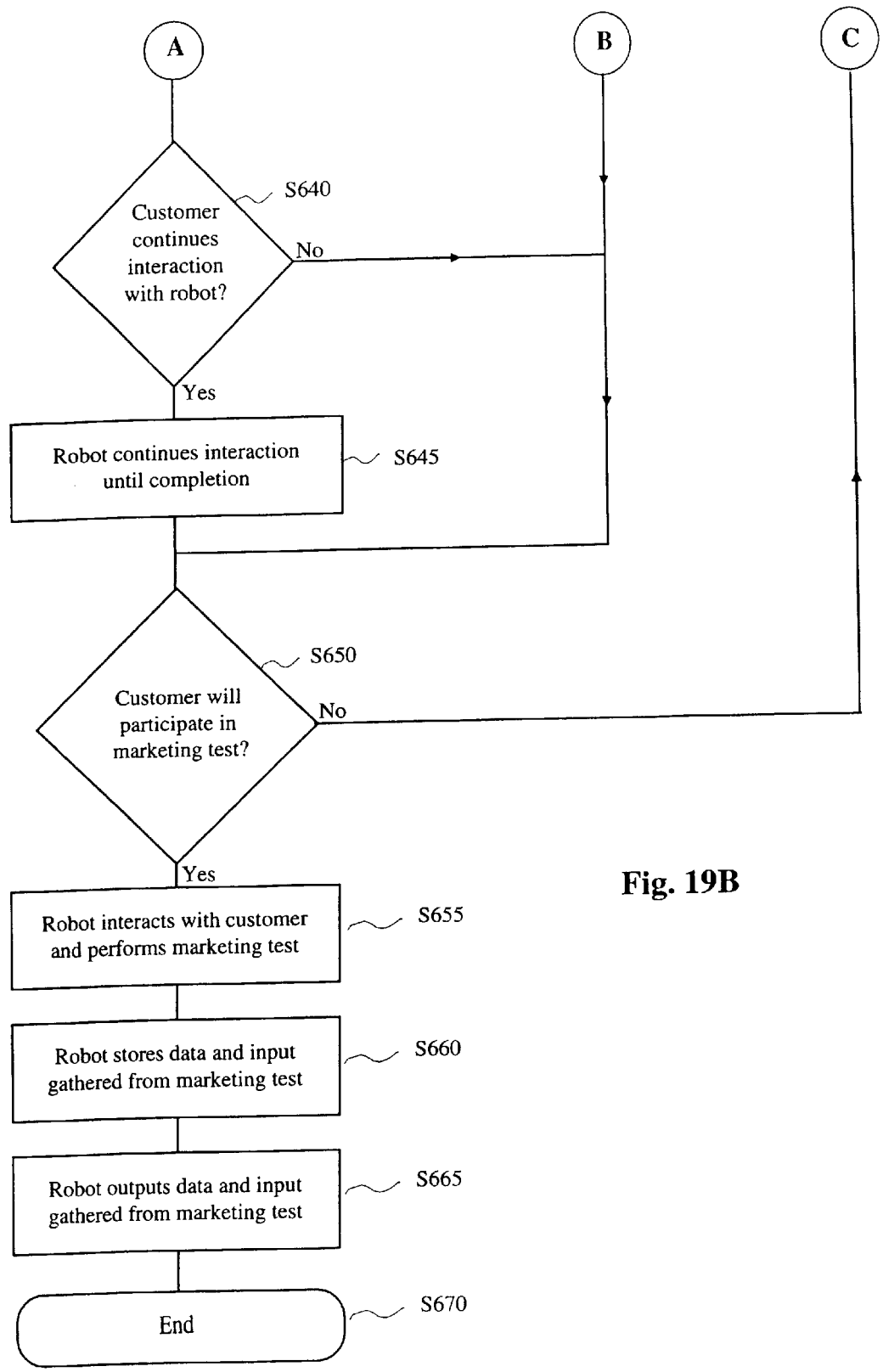

In a further embodiment of the method and system of the invention, the robot is utilized to facilitate a retail environment by performing a marketing and analysis function through interaction with customers and the gathering of information on customer responses and input, as shown in FIG. 19. The process begins in step S600, and then passes to step S605. In step S605, the robot is placed within the retail environment to perform the marketing and analysis function. Then, in step S610, the robot is commanded to perform a marketing and analysis function. Along with the command to perform the marketing function, marketing information and data is input to the robot via a suitable communication interface with a central command or a remote system user. It should be appreciated, however, that the marketing information and data may be provided in the robot before it is placed within the retail environment. It should be further appreciated that the marketing data and information may be updated, and stored in the memory of the robot, through any suitable communication interface with the robot while it is in the retail environment. Accordingly, a remote user or central command could send updated marketing information data and commands to the retail robot electronically and the robot would replace the then-existing marketing function with the updated data and commands.

As shown in FIG. 19, once the robot has the appropriate marketing data and information, the robot begins to facilitate the retail environment by performing the marketing function. Accordingly, in step S615, the robot navigates the retail environment and monitors for any marketing triggers. It should be appreciated that a marketing trigger is basically an opportunity for the robot to perform its marketing tasks. For example, this may include either engaging a customer in a marketing test following an interaction, or voluntarily initiating a contact with a customer found in the retail environment to ask for the customer's participation in a marketing test.

Accordingly, while the robot is navigating through the retail environment, the system determines whether or not the robot has received a marketing trigger, in step S620. If the robot does not detect a marketing trigger, the robot returns to step S615 and continues to navigate through the retail environment monitoring for marketing triggers. However, if in step S620, the robot detects a marketing trigger, the system determines whether or not the marketing trigger is a customer interaction, in step S625. If the marketing trigger is a customer interaction, the process passes to step S630, where the robot processes the customer interaction and responds to the interaction. Then, the process passes to step S640, where the system determines if the customer is continuing the interaction with the robot. If the customer continues to interact with the robot, the robot continues the interaction until completion in step S645. Then, the process passes to step S650.

Alternatively, if in step S625, the system determines that the marketing trigger is not a customer interaction, the process passes to step S635. In step S635, the marketing trigger is identified as the robot's detection of a customer in the retail environment that has not interacted with the robot. Then, the process passes to step S650. Similarly, in step S640, if the system determines that the customer is not continuing the interaction, the process passes to step S650.

In step S650, the robot determines whether the customer will participate in a marketing test, in accordance with one illustrative embodiment of the invention. If the customer chooses to participate in the marketing test, the process passes to step S655. Then, in step S655, the robot interacts with the customer and performs the marketing test. Once the marketing test is complete, the robot stores the data and input gathered from the marketing test in step S660. Then, in step S665, the robot outputs the data and input gathered from the marketing test. Finally, the process ends in step S670.

An illustrative example of the robot performing a marketing and analysis function begins with the robot placed in the retail environment seeking to gain marketing analysis of products and retail items in the retail environment. The robot would then navigate the retail environment and seek out customers to interact with in order to gain the marketing analysis. A simple interaction could begin with a customer asking a question and the robot providing the necessary response. The robot would then offer the customer an opportunity to participate in the marketing analysis, and provide input on various retail products. The robot would then perform the marketing test on willing customers. This may include providing samples of a given product. As with any robot-customer interaction, once the customer has shown no further interest in the interaction with the retail robot, the robot would continue its marketing function and proceed to navigate further in the retail environment seeking out additional customers to interact with.

It should be further appreciated that the robot may be commanded to facilitate the retail environment by performing a combined advertising and marketing function. Accordingly, the steps utilized in the advertising and marketing functions may be combined in any suitable fashion, including removing described steps or adding additional interactive steps, to provide a more effective facilitation of the retail environment with the retail robot.

Although the robot system may perform advertising and marketing functions, it may also be used to monitor the retail environment. Simply put, the robot could be commanded to navigate through the retail environment searching for trigger conditions such as emergencies or persons in need of assistance. For example, emergency trigger conditions could include the detection of fire, smoke, spills, or other hazardous conditions. Also, the robot may be utilized to detect persons that may need assistance, including lost children, customers that appear confused or undecided, or those customers of a suspicious nature, which the robot may find shoplifting or committing theft.

It should further be appreciated that the robot's ability to monitor and maintain the retail environment may extend to those periods of time when no humans are present to interact with. As such the robot would perform a maintenance and security function. Accordingly, the robot may be programmed to handle certain emergency situations, including for example, fire emergencies, burglaries or loss of power in the retail environment. Additionally, the robot may be equipped with audio and video equipment that can provide a record of what the robot observes while monitoring the retail environment. This equipment may further provide the capability of a remote user, in a command center, for example, to monitor the retail environment through the robot, in real time, and direct the robot to investigate specific situations. This includes directing the movement of the robot, its audio and video components, and even may allow the remote user to supplant the voice of the robot for his own. For example, if a burglar was detected in the retail environment, the robot may follow and record the crime being committed, or a remote human user may alert the burglar that the police had been contacted and will arrive soon. As stated above, these capabilities may be controlled via any suitable communication interface with the retail robot, and by any type of remote user or central security system. It should be appreciated that once the robot detects an emergency condition, the robot may alert all necessary personnel to the emergency condition.

It should be further understood that in accordance with the robot's ability to operate autonomously the robot will be provided with the necessary programming, tasking and commands to ensure its readiness to facilitate the retail environment. This may require that the robot monitor its own diagnostic system, including its power status and internal components, such that the robot would understand if it needs to be recharged or serviced to maintain its working condition. Then, the robot may alert the necessary personnel that it needs service. For simple service requirements, like the recharging of the robot's batteries, the robot may be commanded to deliver itself to a recharging station where it can autonomously recharge its batteries It should be appreciated that along with the above-described methods of utilizing the retail robot to facilitate a retail environment, several additional methods of using the robot exist which may enhance the retailer-customer relationship. These methods may include circumstances where a customer provides an input to a robot, and the robot responds with information or the performance of a service. Illustratively, one such method may include the robot acting as an ATM (automated teller machine) in the retail environment.

For example, while the robot is performing a task within the retail environment, a customer or employee may approach the robot and request the use of the robot's ATM service. If the robot's current function allows it to break from its current task to perform such ATM services, the robot would receive the user's input, i.e. an ATM card, credit card, or account number. After receiving the user's input or identification, the robot would provide the ATM and deliver the money to the user. The robot would then record the transaction for record-keeping purposes. It should be appreciated that the robot could perform the ATM service by initiating a communication interface with a banking system, or could maintain an internal accounting system for handling the distribution of money. Accordingly, the robot would be provided with the necessary safeguards to perform the ATM services similar to those conventional services known in the art.

Figure 20:
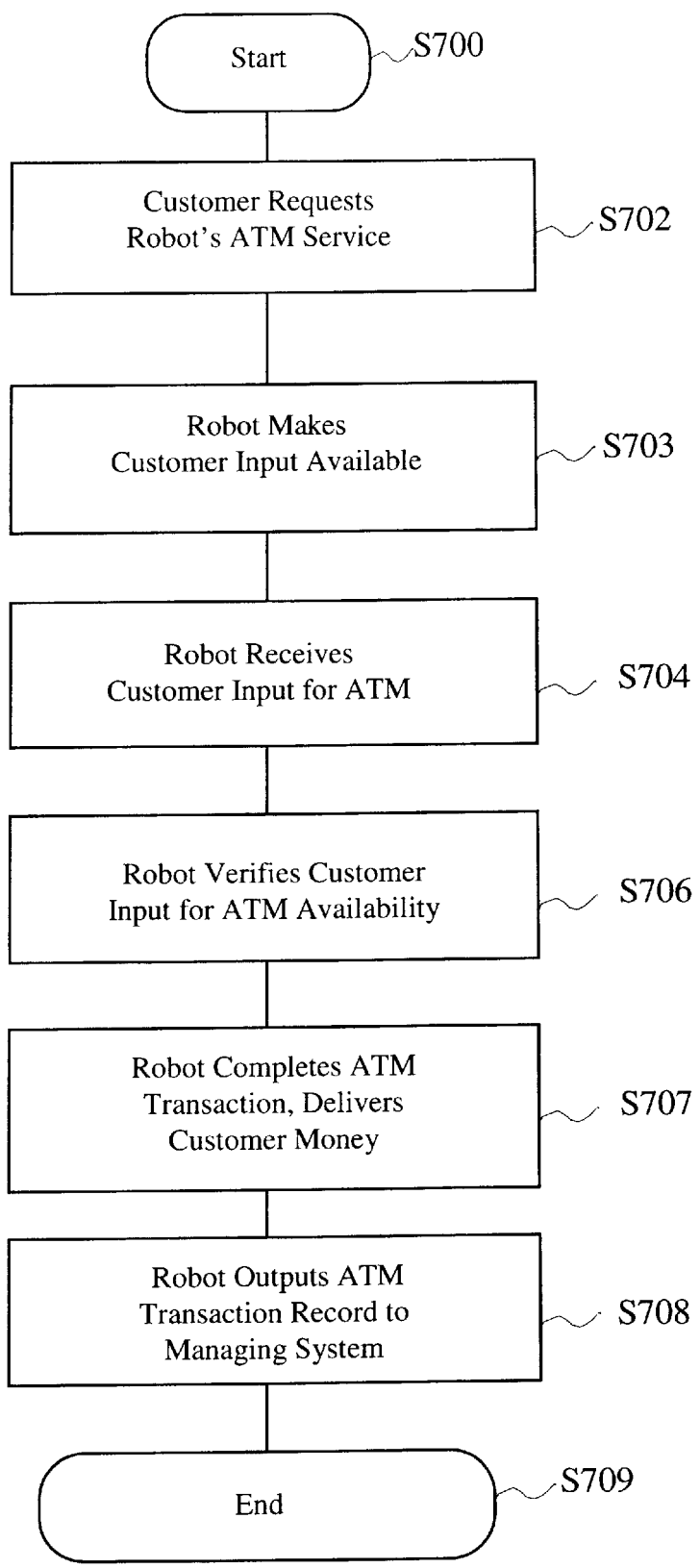
FIG. 20 is a flowchart showing the process of providing ATM services in accordance with one embodiment of the method and system of the invention.

FIG. 20 is a flowchart showing the method performed by the robot system when performing the cash dispensing operations in accordance with one embodiment of the invention. As shown in FIG. 20, the process starts in step S700. Then, the process passes to step S702. In step S702, the customer requests the robot's ATM service. Then, in step S703, the robot makes customer input available, i.e., the robot provides a monitor and keypad, for example. Then, the process passes to step S706.

In step S706, the robot verifies the customer input for ATM availability. Then, in step S707, the robot completes the ATM transaction and delivers the requested money to the customer. Then, the process passes to step S708.

In step S708, the robot outputs the ATM transaction record to the managing system. Then, in step S709, the process ends.

A further illustrative method includes facilitating the retail environment by allowing a customer to obtain a shopping list delivered to the retail robot prior to the customer's arrival in the retail environment. As such, a customer may remotely input a shopping list to a central system or memory that the robot may access via a communication interface. Thus, when the customer encounters the robot in the retail environment, the customer can request the shopping list. Once the robot receives the request for the shopping list, the robot would already have the shopping list in memory, or alternatively, would communicate with the central system and retrieve the list. Then, the robot would deliver the list to the customer in any suitable manner, such as determining the identity of the customer and printing the shopping list. In addition, the customer may obviate the need for the central system and send the shopping list directly to the robot in the retail environment which the customers plans to visit. Thus, through a simple e-mail, the customer could retrieve her shopping list at a given point in the future when the customer enters the retail environment.

Further, it should be appreciated that the central system working in conjunction with the robot system, or alternatively the robot system itself, could provide additional information to a shopping list received from a customer. For example, the robot system could identify items on the shopping list and associate relevant information to these items. That is, for example, the printed shopping list would include the original items listed along with such relevant information. The relevant information might include inventory status in a particular store, price information, or other product information. The customer's use of the robot as a shopping list provider may also allow the retailer to track the customer's spending patterns, and provide coupons or cross-sales for retail products related to the customer's historical information.

Figure 21:
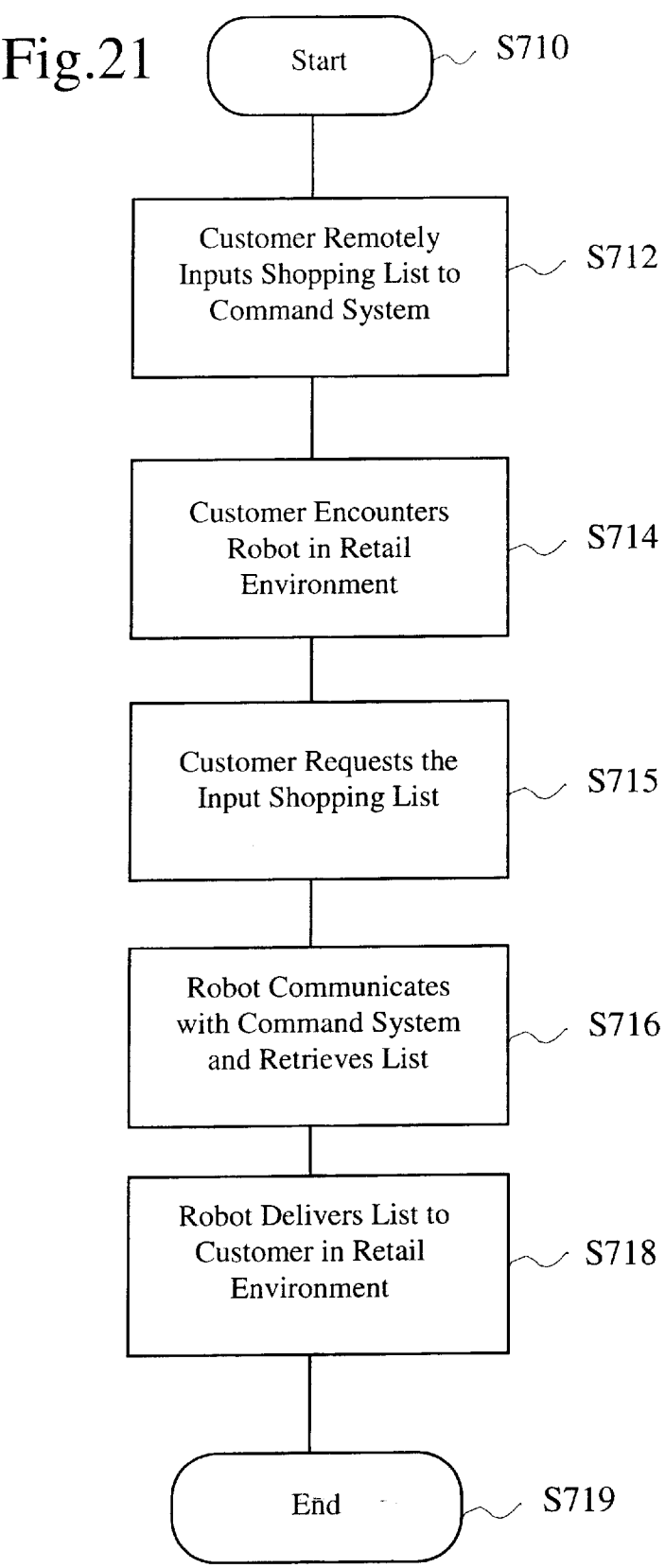
FIG. 21 is a flowchart showing aspects of providing a shopping list to a customer in accordance with one embodiment of the method and system of the invention.

FIG. 21 is a flowchart showing a process by which the robot system provides a grocery list to a customer, in accordance with one embodiment of the invention. As shown in FIG. 21, the process starts in step S710. Then, in step S712, the customer remotely inputs the shopping list to a command system. For example, the command system may be a central system having a capability to interface with a robot or a fleet of robots in a particular retail environment. After step S712, the process passes to step S714. In step S714, the customer encounters the robot in the retail environment. Then, in step S715, the customer requests the input shopping list. That is, for example, the customer requests the shopping list that was e-mailed to the command system. Then, the process passes to step S716. In step S716, the robot communicates with the command system and retrieves the requested list. It should be appreciated that steps S715 and steps S716 may further include confirmation of the identity of the customer requesting the shopping list. After step S716, the process passes to step S718. In step S718, the robot delivers the list to the customer in the retail environment. Then, in step S719, the process ends.

It should be appreciated that one or more robot systems may operate in a given retail environment. That is, for example, a fleet of robots could be operated in a large retail environment. Accordingly, in the example above relating to a shopping list, the shopping list might be transmitted and stored within each of the robots in the robot fleet. This would provide the benefit that the customer could approach any of the robots in the robot fleet. That is, any of the robots in the robot fleet would have the customer's shopping list. Once the customer retrieves his or her shopping list, that robot system could then communicate with the other robots in the retail environment informing the other robots of the status of the customer's acquisition of the shopping list. Thereafter, further desired action could be performed by the various robots in the fleet such as deleting that particular shopping list from each robot's respective memory banks.

In accordance with one embodiment of the system and method of the invention, a consumer from home might check stock and pricing information on various products utilizing the Internet, which is in turn connected to the robot. The robot might use visual information to confirm stock or might alternatively access a database of the store. Also, a consumer might look through the eyes of the robot, i.e., utilizing the camera onboard the robot, to observe the particular store or other retail environment, for example. Of course, it should be appreciated that privacy issues should be taken into consideration.

It should be further understood that further applications of the retail robot to facilitate the retail environment and enhance the retailer/customer relationship may include the use of wireless communication to the retail robot to update retail information, ads, displays, product locations, recipes for dissemination to customers, food suggestions, input from manufacturers on special deals, or coupons, for example. In addition, the retail robot may also facilitate the retailer/customer relationship through its ability to provide varying interactive speech and personality functions, to serve as a payment system in the retail environment, including receiving credit card payments, and to participate in games that entertain customers in the retail environment.

An important function of the retail robot facilitating the retail environment is its interaction with human customers. Once the robot recognizes and receives a human contact, the robot must respond to that interaction. A human interaction or contact may come in the form of a touch, a voice command, or other suitable communication technique. Once the robot has recognized the human contact, it then formulates its response to human interaction. The robot then determines an appropriate physical response for the interaction as well. Finally, the robot manifests its physical response to the human interaction. As stated above, the retail robot may manifest its physical response to the human interaction in many different forms, including changing its voice and mannerisms to enhance the customers reception of the robot interaction response. This may incorporate assessing this source of the human interaction contact, and determining an appropriate physical expression to give. This may include the robot adjusting its eyebrows, moving its ears, blinking its eyelids, adjusting its neck and head, and other appropriate physical mannerisms. As stated above, the robot may also change the tone or frequency of its voice to represent a personality more pleasing to the detected source of human interaction. Furthermore, an LED mouth may also show human mannerisms and expressions that will also enhance the pleasure of the customer interacting with the retail robot.

Referring now to the above-described FIGS. 11–19, and the illustrative examples in accordance with the method and system of the invention, it should be appreciated that the steps preceding the robot's facilitation of the retail environment may be accomplished in several manners. For example, the retail robot may be provided in the retail environment after it has been commanded to perform a retail function. Thus, one should appreciate that the steps of placing the retail robot in the retail environment and commanding it to perform a retail function may be interchanged as necessary without diverting from the scope of the invention. Furthermore, it should be appreciated that the retail robot may receive its commanded function in any suitable manner. This may include providing the necessary programming and functionality in the robot before it is placed within the retail environment. The robot may also receive its command function via a communication interface while in the retail environment. Accordingly, the robot may enter the retail environment with predetermined periodic tasks and the ability to handle triggers that arise in the retail environment, allowing the robot to function autonomously in the retail environment for an indefinite period of time. However, the robot user may determine that it would be more effective to facilitate the retail environment by continuously changing the retail functions of the robot, and utilizing the robot as an interactive tool for the retail environment.

As described above, one embodiment of the processing system of the invention as shown in FIGS. 1–8 is in the form of a computer or computer system. As used herein, the term "computer system" is to be understood to include at least one processor utilizing a memory or memories. The memory stores at least portions of an executable program code at one time or another during operation of the processor. Additionally, the processor executes various instructions included in that executable program code. An executable program code means a program in machine language or other language that is able to run in a particular computer system environment to perform a particular task. The executable program code process data in response to commands by a user. As used herein, it will be appreciated that the term "executable program code" and term "software" mean substantially the same thing for the purposes of the description as used herein.

Further, it is to be appreciated that to practice the system and method of the invention, it is not necessary that the processor, or subportions of the processor, and/or the memory, or subportions of the memory be physically located in the same place or disposed in the same physical portion of the robot system 10. That is, it should be appreciated that each of the processor and the memory may be located in geographically distinct locations and connected so as to communicate in any suitable manner, such as over a wireless communication path, for example. Additionally, it should be appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, each respective portion of the memory described above may include two or more portions of memory in two or more physical locations. Further, the memory could include or utilize memory stores from the Internet, Intranet, Extranet, LAN or some other source or over some other network, as may be necessary or desired.

As described above, the invention may illustratively be embodied in the form of a computer or computer operating system. It is to be appreciated that the software that enables the computer operating system to perform the operations described above may be supplied on any of a wide variety of data holding media. Further, it should be appreciated that the implementation and operation of the invention may be in the form of computer code written in any suitable programming language, which provide instructions to the computer.

It should further be appreciated that the software code or programming language that is utilized in a computer system to perform the various operations of the above described invention may be provided in any of a wide variety of forms. Illustratively, the software may be provided in the form of machine language, assembly code, object code, or source language, as well as in other forms. Further, the software may be in the form of compressed or encrypted data utilizing an encryption algorithm.

Additionally, it should be appreciated that the particular medium utilized may take on any of a variety of physical forms. Illustratively, the medium may be in the form of a compact disk, a DVD, an integrated circuit, a hard disk, a floppy diskette, a magnetic tape, a RAM, a ROM, or a remote transmission, as well as any other medium or source of information that may be read by a computer or other operating system.

Accordingly, the software of the method of the invention, which is utilized in operation of the robot system 10, may be provided in the form of a hard disk or be transmitted in some form using a direct wireless telephone connection, the Internet, an Intranet, or a satellite transmission, for example. Further, the programming language enabling the system and method of the invention as described above may be utilized on all of the foregoing and any other medium by which software or executable program code may be communicated to and utilized by a computer or other operating system.

As described herein, the system and method of the invention may utilize an application program, a collection of separate application programs, a module of a program that is designed to handle, or a portion of a module of a program, for example. As noted above, it should be appreciated that the computer language used in the system and method of the invention may be any of a wide variety of programming languages. Further, it is not necessary that a single programming language be utilized in conjunction with the operation of the system and method of the invention. Rather, any number of different programming languages may be utilized as is necessary or desirable.

As described above, in the system and method of the invention, a variety of user interfaces are utilized. A user interface may be in the form of a dialogue screen for example. As used herein, a user interface includes any software, hardware or combination of hardware and software used in an operating system that allows a user to interact with the operating system. A user interface may include any of a touch screen, keyboard, mouse, voice reader, voice recognizer, dialogue screen, menu box, a list, a checkbox, a toggle switch, a pushbutton or any other object that allows a user to receive information regarding the operation of the program and/or provide the operating system with information. Accordingly, the user interface is any device that provides communication between a user and a computer. The information provided by the user to the computer through the user interface may be in the form of a command, a selection or data, or other input, for example.

A user interface is utilized by an operating system running an application program to process data for a user. As should be appreciated, a user interface is typically used by a computer for interacting with a user either to convey information or receive information. However, it should be appreciated that in accordance with the system and method of the invention, it is not necessary that a human user actually interact with a user interface generated by the operating system of the invention. Rather, it is contemplated that the user interface of the invention interact, i.e., convey and receive information, in communication with another operating system or computer, rather than a human user. Further, it is contemplated that the user interfaces utilized in the system and method of the invention may interact partially with another operating system while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its preferred embodiment, it is to be understood that this disclosure is only illustrative and exemplary of the present invention and is made merely for the purposes of providing a full and enabling disclosure of the invention. Many modifications to the embodiments described above can be made without departing from the spirit and scope of the invention. Accordingly, the foregoing disclosure is not intended to be construed or to limit the present invention or otherwise to exclude any other such embodiments, adaptations, variations, modifications and equivalent arrangements.

What is claimed is:

1. A robot for use in a retail environment, the robot comprising:
   a processor portion for processing data in the robot;
   a memory portion, the processor portion storing data in the memory portion and retrieving data from the memory portion, the memory portion storing retail data relating to retail activity;
   an interaction portion for interfacing with a customer, the interaction portion receiving input from the customer and generating output to the customer, the output based on the retail data relating to retail activity, the processor portion controlling the interaction portion; and
   a transport portion for transporting the robot.

2. The robot according to claim 1, the processor portion controlling the transport portion to transport the robot from a first location to a second location.

3. The robot according to claim 2, wherein the input from a person is a request for a specified item, the processor portion retrieving an item location for the specified item from the memory portion.

4. The robot according to claim 3, wherein the processor portion presents the item location to the person interfacing with the interaction portion.

5. The robot according to claim 3, wherein:
   the first location is a location at which the customer or other person made the request for the specified item; and
   the second location is a location at which the specified item is physically located.

6. The robot according to claim 2, wherein:
   the memory portion includes a daily special memory portion, the daily special memory portion containing daily special data relating to daily specials; and
   the processor portion retrieving the daily special data from the daily special memory portion, the processor portion presenting daily special information based on the daily special data using the interaction portion.

7. The robot according to claim 2, further including a body portion, the body portion containing at least one of the processor portion, the memory portion, and the interaction portion.

8. The robot according to claim 7, further including;
   a holding container attached to the body portion; and
   an armature portion, wherein the processor portion controls the armature portion such that the armature portion removes items from the holding container and presents the items to the customer.

9. The robot according to claim 7, further including a sensor system including a plurality of sensors mounted on the body portion and in communication with the processor portion, the plurality of sensors inputting information relating to the retail environment, the sensor system communicating the information to the processor portion.

10. The robot according to claim 9, wherein:
    the sensors input obstacle information relating to obstacles in the retail environment, the sensor system communicating the obstacle information to the processor portion; and
    the processor portion controlling the transport portion to effect movement from the first location to the second location while avoiding the obstacles.

11. The robot according to claim 9, wherein the sensor system includes a position detecting portion, the position detecting portion detecting the position of the robot in the retail environment.

12. The robot according to claim 9, wherein the sensors include at least one of a visual sensor and audio sensor.

13. The robot according to claim 12, further including:
    a recording portion, the recording portion recording visual image information and audio information by the at least one of the visual sensor and the audio sensor; and
    a transmission portion, the transmission portion outputting the visual image information and audio information to a destination outside of the robot.

14. The robot according to claim 9, wherein the sensors include at least one gaseous sensor, the gaseous sensor detecting information relating to the content of the air in the retail environment.

15. The robot according to claim 9, wherein the sensors include at least one heat sensor.

16. The robot according to claim 1, wherein the interaction portion senses the approach of a customer in the retail environment.

17. The robot according to claim 16, wherein the interaction portion outputs a communication to the customer when the approach of the customer is sensed.

18. The robot according to claim 1, wherein the robot includes a body portion, the body portion displaying sales promotion materials directed to the retail environment, the body portion encloses at least one of the processor portion and the memory portion.

19. The robot according to claim 18, wherein the sales promotion materials include at least one of materials to attract the attention of the customer and materials to advertise goods to the customer.

20. The robot according to claim 18, wherein the body portion includes:
    a base portion, the base portion enclosing at least one of the processor portion and the memory portion; and
    an upper portion, the upper portion disposed upon the base portion, the upper portion presenting indicia indicative of a product to the customer.

21. The robot according to claim 18, wherein the body portion represents a persona, the persona selected from the group consisting of an English robot, an old west robot, and a clown robot.

22. The robot according to claim 18, further including a card reader, the card reader disposed on the body portion; and
    a cash dispenser portion, the cash dispenser portion in communication with the processing portion, wherein the cash dispensing portion dispenses cash responsive to data input by the card reader.

23. The robot according to claim 2, wherein the interaction portion includes:
    a video interface, the processor portion outputting video data to the video interface for presentation to the customer; and
    a voice generation portion, the processor portion outputting audio data to the voice generation portion for presentation to the customer.

24. The robot according to claim 23, wherein the video interface is selected from the group consisting of a liquid crystal display (LCD) and a video screen.

25. The robot according to claim 23, wherein the memory portion includes a product memory portion, the processing portion retrieving product related data from the product memory portion and outputting the product related data to the video interface for presentation to a customer.

26. The robot according to claim 25, wherein the product related data also includes audio data, the processor portion outputting the audio data to the voice generation portion for presentation to the customer synchronously with the output of the product related data to the video interface.

27. The robot according to claim 23, wherein the interaction portion further includes a touch screen that inputs data from a customer by a customer physically touching portions of the touch screen, the interaction portion forwarding data input into the touch screen to the processor portion for processing.

28. The robot according to claim 23, wherein the interaction portion further includes at least one of a key pad for inputting information from a customer and a printer for outputting information to a customer.

29. The robot according to claim 23, further including a bar code reader that scans merchandise labels, the processor portion outputting information to at least one of the video interface and the voice generation portion responsive to the information input by the bar code reader portion.

30. The robot according to claim 2, wherein the interaction portion includes:
  a card scanner portion to scan a customer card; and
  a printer portion, wherein the processor portion outputs information to the printer for printing responsive to the scanning of the card scanner portion.

31. The robot according to claim 2, further including a theft detection portion in communication with the processor portion, the theft detection portion monitoring operating conditions of the robot for conditions indicative of theft.

32. The robot according to claim 31, wherein the theft detection portion includes a proximity sensor, the proximity sensor monitoring the robot's position in the retail environment.

33. The robot according to claim 2, further including a punch card device in communication with the processor portion, the punch card device for receiving a punch card indicative of desired items of a customer, wherein the processor portion inputs data of input by the punch card reader effects movement of the robot using the transfer portion to locations in the retail environment in which the desired items are located.

34. The robot according to claim 2, further including a wireless receiver, the wireless receiver for inputting communications from customers regarding desired items sold in the retail environment.

35. A retail activity environment system, the system comprising:
  a robot for use in the retail environment, the robot comprising:
    a processor portion for processing data in the robot;
    a memory portion, the processor portion storing data in the memory portion and retrieving data from the memory portion, the memory portion storing retail data relating to retail activity;
    an interaction portion for interfacing with a customer, the interaction portion receiving input from the customer and generating output to the customer, the output based on the retail data relating to retail activity, the processor portion controlling the interaction portion; and
    a transport portion, the processor portion controlling the transport portion to transport the robot from a first location to a second location; and
  a base station, the base station interfacing with the robot to exchange data with the robot, the base station including a base computer system.

36. The retail activity environment system according to claim 35, wherein the base station includes a robot interface portion, the robot interface portion inputting data from the robot and outputting data to the robot; and
  the robot includes a base interface portion the base interface portion inputting data from the base and outputting data to the base.

37. The retail activity environment system according to claim 35, wherein the base station includes a docking station having a charger; and
  the robot includes a power source for powering the transport portion, the docking station being physically interfaceable with the robot; and
  wherein the charger being an electrical communication with the power source of the robot when the robot is physically interfaced with the base station.

38. The retail activity environment system according to claim 37, wherein the docking station and the base computer system are disposed in different physical locations, the base computer system and the docking station being in communication with each other.

39. The retail activity environment system according to claim 38, further including a network system, the network system providing communication between the base computer system and the docking station.

40. The retail activity environment system according to claim 37, wherein the base computer system includes a base computing system transponder and the robot includes a robot transponder controlled by the processor portion, wherein the robot and the base computer system communicate using the robot transponder and the base computer system transponder, respectively.

41. A retail system for use in a retail environment, the retail system comprising:
  a processor portion for processing data in the retail system;
  a memory portion, the processor portion storing data in the memory portion and retrieving data from the memory portion, the memory portion storing retail data relating to retail activity;
  an interaction portion for interfacing with a customer or other person, the interaction portion receiving input from the customer and generating output to the customer, the output based on the retail data relating to retail activity, and the interaction portion sensing the approach of a customer in the retail environment, the processor portion controlling the interaction portion and outputting a communication to the customer when the approach of the customer is sensed; and
  a transport portion that transports the retail system form a first location to a second location, the transport portion being controlled by the processor portion.

42. A robot for use in a retail environment, the robot comprising:
  a processor portion for processing data in the robot;
  a memory portion, the processor portion storing data in the memory portion and retrieving data from the memory portion, the memory portion storing retail data relating to retail activity;
  an interaction portion for interfacing with a customer, the interaction portion receiving input from the customer and generating output to the customer, the output based on the retail data relating to retail activity, the processor portion controlling the interaction portion;
  a transport portion for transporting the robot from a first location to a second location;

a body portion, the body portion containing at least one of the processor portion, the memory portion, and the interaction portion;

a sensor system including a plurality of sensors mounted on the body portion and in communication with the processor portion, the plurality of sensors inputting information relating to the retail environment, the sensor system communicating the information to the processor portion, wherein the sensors input obstacle information relating to obstacles in the retail environment, the sensor system communicating the obstacle information to the processor portion, the processor portion controlling the transport portion to effect movement from the first location to the second location while avoiding the obstacles, the sensors include at least one of a visual sensor and audio sensor;

a recording portion, the recording portion recording visual image information and audio information by the at least one of the visual sensor and the audio sensor; and a transmission portion, the transmission portion outputting the visual image information and audio information to a destination outside of the robot.

* * * * *